(12) United States Patent
Maruhashi et al.

(10) Patent No.: US 12,139,045 B2
(45) Date of Patent: Nov. 12, 2024

(54) VEHICLE CONTROL METHOD AND VEHICLE

(71) Applicants: TOYOTA JIDOSHA KABUSHIKI KAISHA, Toyota (JP); ADVICS CO., LTD., Kariya (JP)

(72) Inventors: Nozomu Maruhashi, Mishima (JP); Yuichi Shimizu, Okazaki (JP); Toshiki Hara, Ichinomiya (JP); Yoshitaka Fujita, Susono (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 210 days.

(21) Appl. No.: 18/073,132

(22) Filed: Dec. 1, 2022

(65) Prior Publication Data

US 2023/0173926 A1     Jun. 8, 2023

(30) Foreign Application Priority Data

Dec. 2, 2021 (JP) ................. 2021-196116

(51) Int. Cl.
  *B60L 7/18*     (2006.01)
  *B60K 17/356*   (2006.01)
  *B60T 7/12*     (2006.01)
  *B60T 8/26*     (2006.01)

(52) U.S. Cl.
  CPC .............. *B60L 7/18* (2013.01); *B60K 17/356* (2013.01); *B60T 7/12* (2013.01); *B60T 8/26* (2013.01)

(58) Field of Classification Search
  CPC . B60L 7/18; B60K 17/356; B60T 7/12; B60T 8/26
  See application file for complete search history.

(56) References Cited

U.S. PATENT DOCUMENTS

2016/0304068 A1\* 10/2016 Monzaki ................. B60T 8/171

FOREIGN PATENT DOCUMENTS

| JP | 2005028934 A | \* | 2/2005 | |
| JP | 2016-203751 A |  | 12/2016 | |
| WO | WO-2019077973 A1 | \* | 4/2019 | ............. B60T 13/74 |

\* cited by examiner

*Primary Examiner* — Aryan E Weisenfeld
*Assistant Examiner* — Jeffrey R Chalhoub
(74) *Attorney, Agent, or Firm* — Sughrue Mion, PLLC

(57) ABSTRACT

A vehicle according to the present disclosure includes a brake device and an electronic control unit. The brake device is configured to change a front-rear distribution ratio of braking force with respect to front and rear wheels. The electronic control unit is configured to: control the brake device such that the front-rear distribution ratio is in accordance with a fixed distribution characteristic in which the front-rear distribution ratio is constant regardless of deceleration of the vehicle in at least a part of a first range being a required deceleration range lower than a lower limit value of the deceleration perceivable by a person in the vehicle; and control the brake device such that the front-rear distribution ratio is biased toward the rear wheel than that in the fixed distribution characteristic in a second range in which the deceleration is higher than that in the first range.

12 Claims, 18 Drawing Sheets

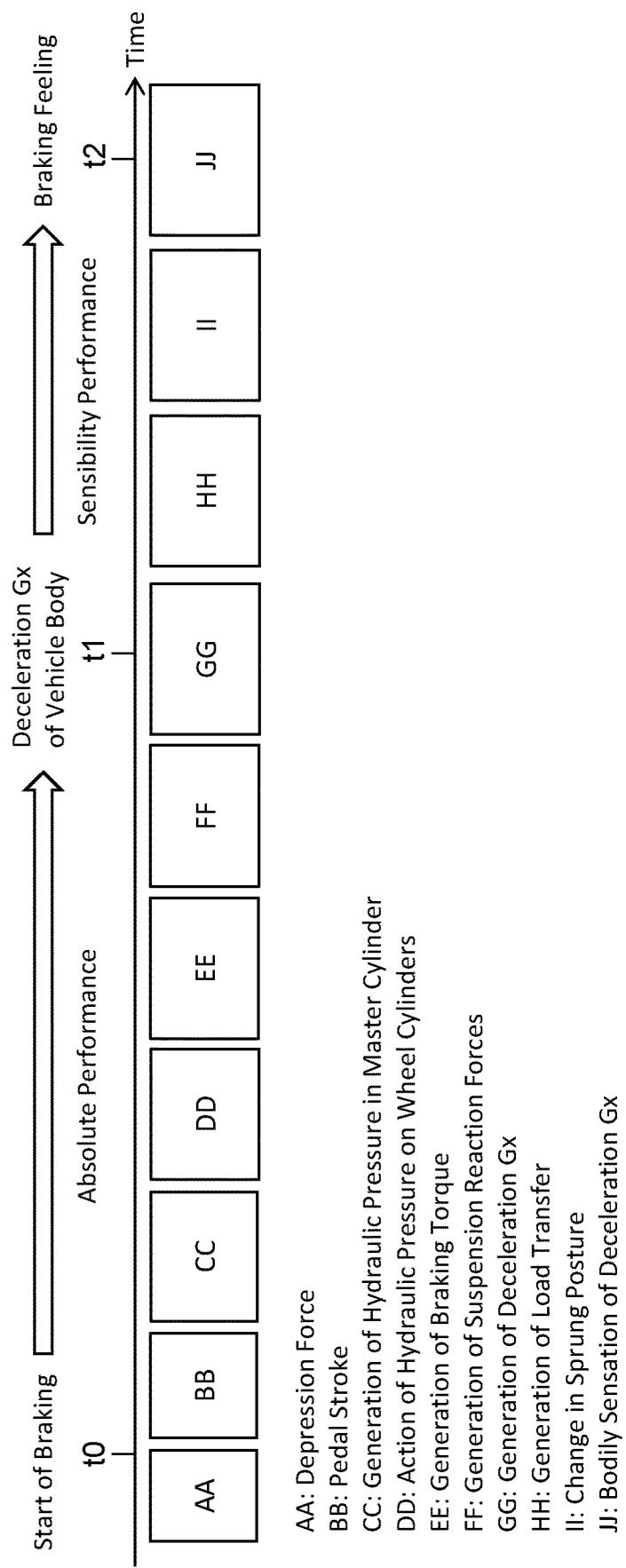

VEHICLE CONTROL METHOD AND VEHICLE

CROSS-REFERENCE TO RELATED APPLICATION

The present disclosure claims priority under 35 U.S.C. § 119 to Japanese Patent Application No. 2021-196116, filed on Dec. 2, 2021, which is incorporated herein by reference in its entirety.

BACKGROUND

Technical Field

The present disclosure relates to a vehicle control method and a vehicle.

Background Art

JP 2016-203751 A discloses a braking force control device. In order to improve a brake feeling, this control device is configured to generate a command value of braking force by applying a filter process to a required braking force based on a braking operation amount, and change a damping ratio of the filter process in accordance with a change in the required braking force.

SUMMARY

As a result of earnest research by the inventors of the present disclosure, the following findings have been obtained. That is, a person in a vehicle obtains a feeling of braking not only by the occurrence of the vehicle body deceleration but also by the combination of the occurrence of the deceleration and a change in the vehicle posture. In order to improve the feeling of braking (more specifically, for example, a feeling of deceleration and a sense of security for braking), it is effective to cause a person on board to perceive a change in the vehicle braking posture (i.e., the vehicle posture during braking) which causes a visual change or a bodily sensation change of the person which leads to improvement of the feeling of braking. Also, this kind of change in the vehicle braking posture that leads to the improvement of the feeling of braking differs depending on the deceleration range during braking. The technique described in JP 2016-203751 A does not focus on the findings described above and still leaves room for improvement in this respect.

The present disclosure has been made in view of the problem described above, and an object of the present disclosure is to provide a vehicle control method and a vehicle that can improve the feeling of braking in a plurality of deceleration ranges.

A vehicle control method according to the present disclosure is a method of controlling a vehicle including a brake device configured to change a front-rear distribution ratio of braking force with respect to front and rear wheels. This method includes: controlling the brake device such that the front-rear distribution ratio is in accordance with a fixed distribution characteristic in which the front-rear distribution ratio is constant regardless of deceleration of the vehicle in at least a part of a first range being a required deceleration range lower than a lower limit value of the deceleration perceivable by a person in the vehicle; and controlling the brake device such that the front-rear distribution ratio is biased toward the rear wheel than that in the fixed distribution characteristic in a second range in which the deceleration is higher than that in the first range.

A vehicle according to the present disclosure includes a brake device and an electronic control unit. The brake device is configured to change a front-rear distribution ratio of braking force with respect to front and rear wheels. The electronic control unit is configured to: control the brake device such that the front-rear distribution ratio is in accordance with a fixed distribution characteristic in which the front-rear distribution ratio is constant regardless of deceleration of the vehicle in at least a part of a first range being a required deceleration range lower than a lower limit value of the deceleration perceivable by a person in the vehicle; and control the brake device such that the front-rear distribution ratio is biased toward the rear wheel than that in the fixed distribution characteristic in a second range in which the deceleration is higher than that in the first range.

According to the present disclosure, in the first range of the required deceleration, a front-rear distribution ratio is selected that is more suitable for actively causing a pitch change than in the second range. This makes it possible to cause a person onboard such as a driver to perceive a feeling of deceleration earlier than the perception of the deceleration by using the perception by a change in visual sensation caused by the movement of the head of the person due to the pitch change. As a result, the feeling of deceleration in the first range can be improved. Moreover, in the second range, a front-rear distribution ratio is selected that is more suitable for actively generating an increase in the amount of heave (i.e., diving of the vehicle body) than in the first range. This makes it possible to improve the feeling of security of the person onboard with respect to braking.

As described above, according to the braking force distribution characteristic of the present disclosure obtained by changing the front-rear distribution ratio in accordance with the deceleration of the vehicle, the feeling of braking can be improved satisfactorily in a plurality of deceleration ranges.

BRIEF DESCRIPTION OF THE DRAWINGS

FIG. 8 is a diagram used to describe a temporal process from when a driver depresses a brake pedal to when the driver obtains a braking feeling;

DETAILED DESCRIPTION

It is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment 1-1. Configuration Example of Vehicle

Figure 1:
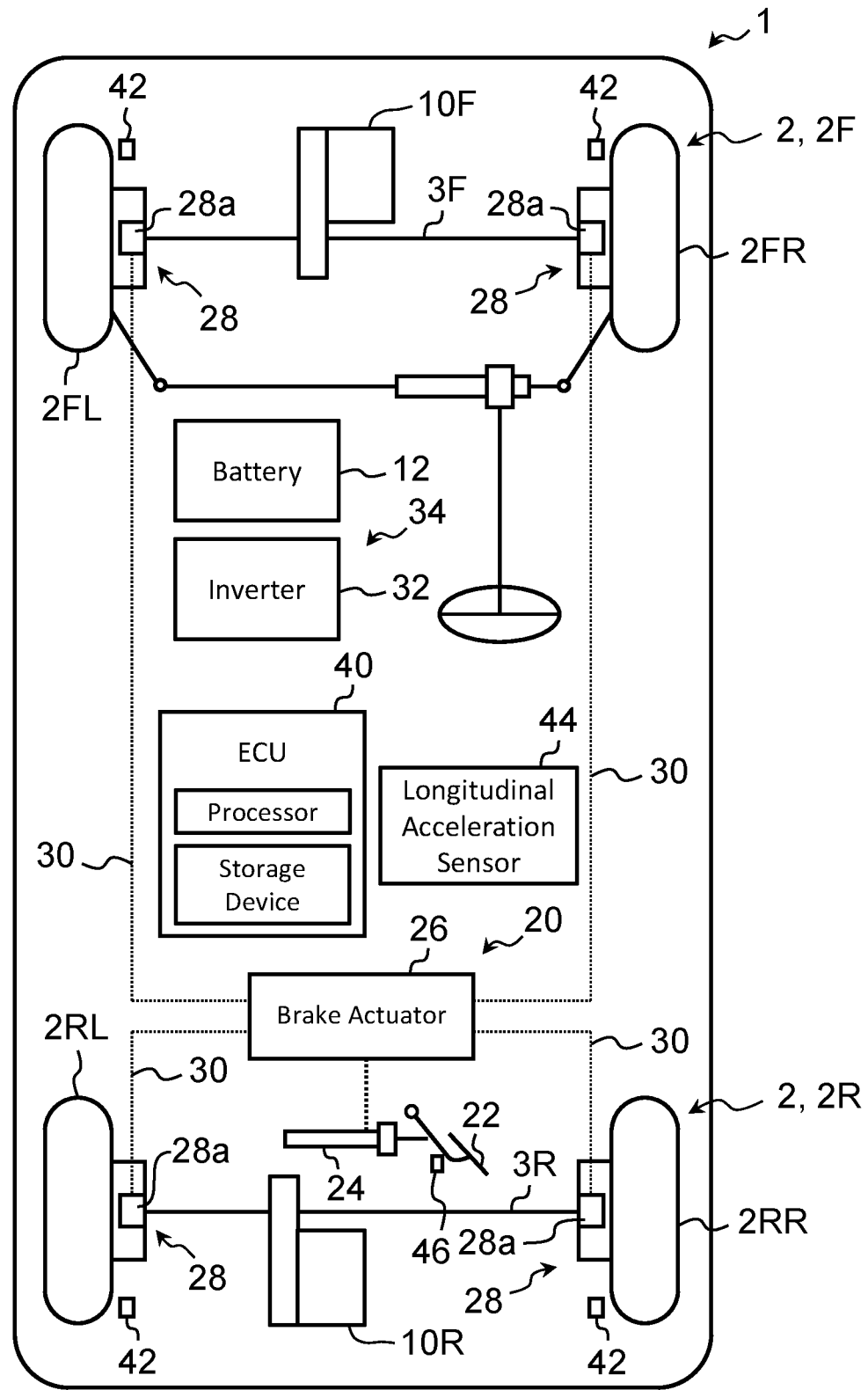
FIG. 1 is a diagram schematically illustrating an example of the configuration of a vehicle according to a first embodiment.

FIG. 1 is a diagram schematically illustrating an example of the configuration of a vehicle 1 according to a first embodiment. The vehicle 1 includes four wheels 2. In the following description, a left front wheel, a right front wheel, a left rear wheel, and a right rear wheel are referred to as 2FL, 2FR, 2RL, and 2RR, respectively. In addition, the front wheels may be collectively referred to as 2F, and the rear wheels may be collectively referred to as 2R.

The vehicle 1 includes a front wheel electric motor 10F configured to drive the front wheels 2F via a front wheel drive shaft 3F, and a rear wheel electric motor 10R configured to drive the rear wheels 2R via a rear wheel drive shaft 3R. More specifically, as an example, the vehicle 1 is a battery electric vehicle (BEV) driven by the electric motors 10F and 10R that are operated by electric power supplied from a battery 12. However, the "vehicle" according to the present disclosure may be, for example, a hybrid electric vehicle (HEV) including an internal combustion engine together with one or more electric motors as the power sources of the vehicle.

The vehicle 1 includes a brake device 20. The brake device 20 includes a brake pedal 22, a master cylinder 24, a brake actuator 26, brake mechanisms 28, and hydraulic pipes 30. The master cylinder 24 is configured to generate a hydraulic pressure according to the depression force of the brake pedal 22 and supply the generated hydraulic pressure (brake hydraulic pressure) to the brake actuator 26.

The brake actuator 26 includes a hydraulic circuit (not shown) interposed between the master cylinder 24 and the brake mechanisms 28. The hydraulic circuit includes a pump configured to increase the brake hydraulic pressure without depending on the master cylinder pressure, a reservoir for storing brake fluid, and a plurality of electromagnetic valves.

The brake mechanisms 28 are connected to the brake actuator 26 via the hydraulic pipes 30. The brake mechanisms 28 are arranged for the respective wheels 2. The brake actuator 26 is configured to distribute the brake hydraulic pressure to the brake mechanism 28 of each wheel 2. More specifically, the brake actuator 26 can supply the brake hydraulic pressure to the brake mechanism 28 of each wheel 2 using the master cylinder 24 or the above-described pump as a pressure source. Each of the brake mechanisms 28 has a wheel cylinder 28a that operates in accordance with the supplied brake hydraulic pressure. When the wheel cylinder 28a is operated by the brake hydraulic pressure, brake pads are pressed against a brake disc. As a result, a friction braking force is applied to the wheel 2.

Moreover, the brake actuator 26 can independently adjust the brake hydraulic pressure applied to each wheel 2 by controlling various electromagnetic valves provided in the hydraulic circuit. More specifically, the brake actuator 26 has a pressure increasing mode for increasing the pressure, a pressure holding mode for holding the pressure, and a pressure decreasing mode for decreasing the pressure as control modes of the brake hydraulic pressure. The brake actuator 26 can make the control mode of the brake hydraulic pressure different for each wheel 2 by controlling ON/OFF of various electromagnetic valves. The friction braking force applied to each wheel 2 is determined in accordance with the brake hydraulic pressure supplied to each wheel cylinder 28a. By changing the control mode in this manner, the brake actuator 26 can independently control the braking force of each wheel 2.

The brake device 20 further includes a regenerative brake device 34. Specifically, the vehicle 1 includes an inverter 32 configured to drive the electric motors 10F and 10R. The inverter 32 is controlled on the basis of commands from an electronic control unit (ECU) 40 described below. Under the control of the inverter 32, each of the electric motors 10F and 10R functions as an electric motor configured to generate a vehicle driving torque. Each of the electric motors 10F and 10R also functions as a generator configured to be driven by the rotation of the wheels 2F and 2R during deceleration of the vehicle 1 to generate regenerative torque (i.e., negative torque). The magnitude of the regenerative torque is controlled by the inverter 32.

The regenerative brake device 34 is provided with the electric motors 10F and 10R and the inverter 32. Thus, the regenerative brake device 34 can control a front wheel regenerative braking force applied to the front wheels 2F by using the front wheel electric motor 10F, and a rear wheel regenerative braking force applied to the rear wheels 2R by using the rear wheel electric motor 10R.

The vehicle 1 further includes the ECU 40. The ECU 40 includes a processor, a storage device, and an input/output interface. The input/output interface receives sensor signals from various sensors mounted in the vehicle 1 and outputs operation signals to various actuators (such as the electric motors 10F and 10R and the brake actuator 26) and the inverter 32. Various control programs for controlling the various actuators and the inverter 32 are stored in the storage device. The processor reads a control program from the storage device and executes the control program, whereby various controls using the various actuators and the inverter 32 are realized. It should be noted that the ECU 40 may be configured by combining a plurality of ECUs.

The various sensors described above include, for example, wheel speed sensors 42, a longitudinal acceleration sensor 44, and a brake position sensor 46. The wheel speed sensors 42 are arranged for the respective wheels 2, and each output a wheel speed signal responsive to the rotational speed of the wheel 2. The longitudinal acceleration sensor 44 outputs an acceleration signal responsive to the acceleration of the vehicle 1 in the longitudinal direction (i.e., longitudinal G). The brake position sensor 46 outputs a signal responsive to the amount of depression of the brake pedal 22.

1-2. Brake Control

The brake device 20 having the configuration described above is configured to change a front-rear distribution ratio $\alpha$ of the braking force with respect to the front wheels 2F and the rear wheels 2R. When the braking force is generated in the front wheels 2F and the rear wheels 2R, a reaction force of suspensions 4F and 4R (see FIG. 2 described below) according to the generated braking force is generated. When the generated suspension reaction force changes, the vehicle posture during braking (hereinafter, also referred to as "vehicle braking posture") changes. The suspension reaction force can be controlled by adjusting the front-rear distribution ratio $\alpha$ of the braking force.

Accordingly, in the present embodiment, braking force distribution control is performed in consideration of the vehicle posture in order to achieve a vehicle braking posture with a high braking feeling (more specifically, for example, a feeling of deceleration and a feeling of security with respect to the braking) of a person on board by using the suspension reaction force. In this braking force distribution control, the front-rear distribution ratio $\alpha$ of the braking force is changed according to the range of a required deceleration Gxr.

Figure 2:
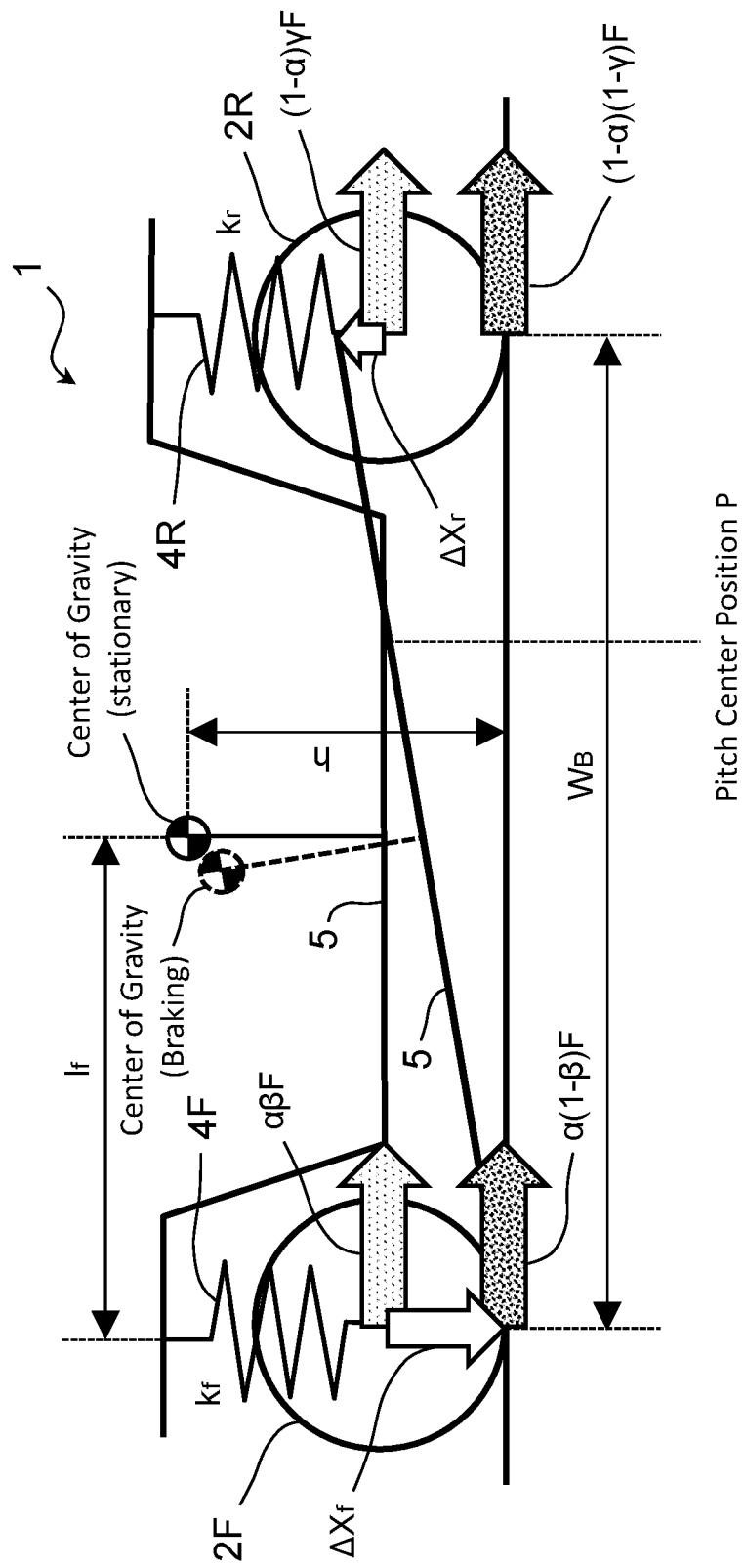
FIG. 2 is a diagram used to describe respective displacement amounts $\Delta X_f$ and $\Delta X_r$ of front and rear suspensions with respect to braking force.

1-2-1. Change in Vehicle Body Braking Posture by Change in Front-Rear Distribution Ratio FIG. 2 is a diagram used to describe the respective displacement amounts $\Delta X_f$ and $\Delta X_r$ of the front and rear suspensions 4F and 4R with respect to the braking force. The front-rear distribution ratio $\alpha$ of the braking force is a ratio of the braking force applied to the front wheels 2F (front wheel braking force) to the sum (i.e., total braking force F) of the front wheel braking force and the braking force applied to the rear wheels 2R (rear wheel braking force). Therefore, the front wheel braking force is $\alpha F$ and the rear wheel braking force is $(1-\alpha)F$.

More specifically, in the example of the vehicle 1 provided with the brake device 20 including the regenerative brake device 34, each of the front wheel braking force and the rear wheel braking force is the sum of the friction braking force and the regenerative braking force. The ratio of the front wheel regenerative braking force to the front wheel braking force (i.e., front wheel regenerative distribution ratio) is herein referred to as $\beta$, and the ratio of the rear wheel regenerative braking force to the rear wheel braking force (i.e., rear wheel regenerative distribution ratio) is referred to as $\gamma$. As a result, each braking force is expressed as follows.

Front wheel regenerative braking force: $\alpha\beta F$

Front wheel friction braking force: $\alpha(1-\beta)F$

Rear wheel regenerative braking force: $(1-\alpha)\gamma F$

Rear wheel friction braking force: $(1-\alpha)(1-\gamma)F$

FIG. 2 schematically shows the suspension displacement amounts $\Delta X_f$ and $\Delta X_r$ obtained when the braking force acts on the vehicle 1. That is, as shown in FIG. 2, at the time of braking, the posture of a vehicle body (sprung structure) 5 changes such that the front wheel side dives and the rear wheel side lifts. Therefore, the suspension 4F on the front wheel side is stroked to the contraction side, and the suspension 4R on the rear wheel side is stroked to the expansion side. The suspension displacement amounts $\Delta X_f$ and $\Delta X_r$ during braking are expressed by the following Equations (1) and (2).

$$\Delta X_f = \left[\frac{h}{W_B} - \alpha\{(1-\beta)\cdot\text{AntiDive} + \beta\cdot\text{AntiLift\_f}\}\right]\frac{F}{k_f} \quad (1)$$

$$\Delta X_r = -\left[\frac{h}{W_B} - (1-\alpha)\{(1-\gamma)\cdot\text{AntiLift\_r} + \gamma\cdot\text{AntiSquat}\}\right]\frac{F}{k_r} \quad (2)$$

In Equations (1) and (2), $W_B$ is the wheelbase and is known. H is the height of the center of gravity when the vehicle is stationary, and is known. $K_f$ and $k_r$ are the spring constants of springs of the suspensions 4F and 4R, respectively, and are known.

Moreover, AntiDive is an anti-dive rate. AntiLift_f and AntiLift_r are anti-lift rates on the front wheel side and the rear wheel side, respectively. AntiSquat is an anti-squat rate. More specifically, the suspension 4F has a suspension geometry configured to generate an anti-dive force and an anti-lift force, which are suspension reaction forces, in response to the generation of a braking force. Furthermore, the suspension 4R has a suspension geometry configured to generate an anti-lift force and an anti-squat force, which are suspension reaction forces, in response to the generation of a braking force. Each of the anti-dive rate, the anti-lift rates, and the anti-squat rate in Equations (1) and (2) is a value that indicates a vertical reaction force ratio, and is a known value determined by the specifications of the suspensions 4F and 4R.

In Equation (1), the product of $h/W_B$ and the total braking force F is related to the amount of load transfer of the vehicle body 5, and corresponds to a force that causes the front wheel side of the vehicle body 5 to dive in the downward direction due to the load transfer. The product of the front wheel friction braking force $\alpha(1-\beta)F$ and AntiDive corresponds to a force that causes the front wheel side of the vehicle body 5 to lift in the upward direction by the anti-dive force that acts as a result of the generation of the front wheel friction braking force $\alpha(1-\beta)F$. The product of the front wheel regenerative braking force $\alpha\beta F$ and the AntiLift_f corresponds to a force that causes the front wheel side of the vehicle body 5 to lift in the upward direction by the anti-lift force that acts as a result of the generation of the front wheel regenerative braking force $\alpha\beta F$.

In Equation (2), the product of $h/W_B$ and the total braking force F corresponds to a force that causes the rear wheel side of the vehicle body 5 to lift in the upward direction due to the load transfer. The product of the rear wheel friction braking force $(1-\alpha)(1-\gamma)F$ and AntiLift_r corresponds to a force that causes the rear wheel side of the vehicle body 5 to dive in the downward direction by the anti-lift force that acts as a result of the generation of the rear wheel friction braking force $(1-\alpha)(1-\gamma)F$. The product of the rear wheel regenerative braking force $(1-\alpha)\gamma F$ and AntiSquat corresponds to a force that causes the rear wheel side of the vehicle body 5 to dive in the downward direction by the anti-squat force that acts as a result of the generation of the rear wheel regenerative braking force $(1-\alpha)\gamma F$.

In addition, as shown in FIG. 2, the points of application of the friction braking force and the regenerative braking force are different from each other with respect to each of the front wheels 2F and the rear wheels 2R. That is, the friction braking force acts on the ground contact surface of the wheel 2. On the other hand, the regenerative torque generated by the electric motor 10F is input to the front wheels 2F via the front wheel drive shaft 3F. Therefore, the regenerative braking force acts on the center position of each of the front wheels 2F. Similarly, the regenerative torque generated by the electric motor 10R is input to the rear wheels 2R via the rear wheel drive shaft 3R. Therefore, the regenerative braking force acts on the center position of each of the rear wheels 2R.

By using the suspension displacement amounts $\Delta X_f$ and $\Delta X_r$ obtained by Equations (1) and (2) described above, a pitch angle θ of the vehicle 1, a heave amount H at the position of the center of gravity of the vehicle 1, and a pitch center position P that change due to braking are represented by the following Equations (3) to (5), respectively. In Equation (4), $l_f$ is the distance between the front wheel drive shaft 3F and the position of the center of gravity and is known.

$$\theta = \tan^{-1}\frac{\Delta X_f - \Delta X_r}{W_B} \quad (3)$$

$$H = \Delta X_f + l_f \tan\theta \quad (4)$$

$$P = \frac{\Delta X_f}{\Delta X_f - \Delta X_r} W_B \quad (5)$$

Figure 3:
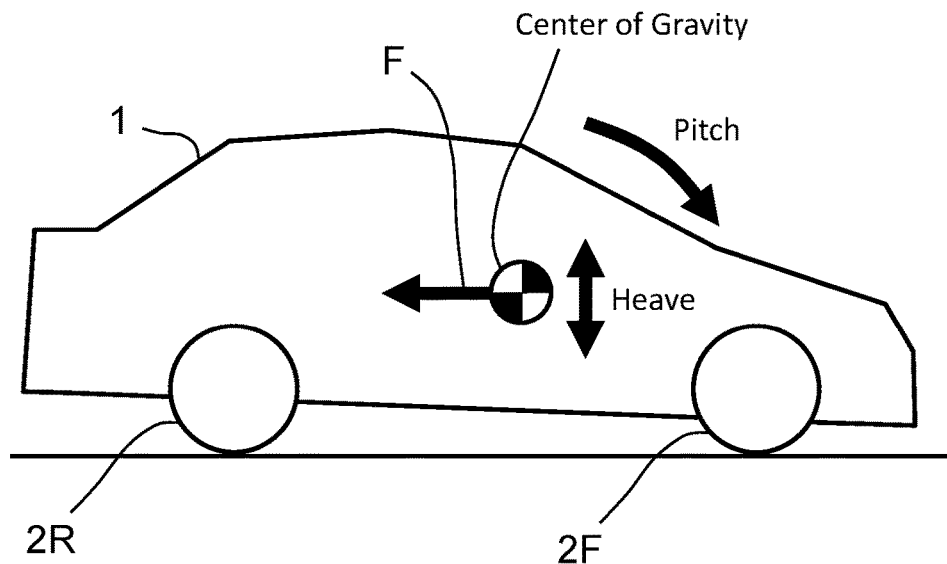
FIG. 3 is a diagram illustrating a vehicle posture (vehicle braking posture) during braking.

FIG. 3 is a diagram illustrating a vehicle posture (vehicle braking posture) during braking. During braking, an inertial force equal to the total braking force F acts toward the front of the vehicle 1. As a result, as shown in FIG. 3, in the vehicle 1, a pitch change occurs such that the front wheel side dives, and a heave change (vertical displacement of the vehicle body 5) occurs. Also, how pitch angle θ and the heave amount H change due to braking changes by changing the front-rear distribution ratio α. This is because when the front-rear distribution ratio α changes, the suspension displacement amounts $\Delta X_f$ and $\Delta X_r$ represented by Equations (1) and (2) described above change.

Additionally, how the pitch angle θ and the heave amount H change due to braking also changes by changing the ratios (regenerative distribution ratios) β and γ. However, in the first embodiment, as an example, the ratios β and γ are assumed to be constant regardless of the deceleration Gx (see FIG. 15 described below). Changing the pitch angle θ and the heave amount H using changes in the ratios β and γ will be described below in a second embodiment.

Figure 4:
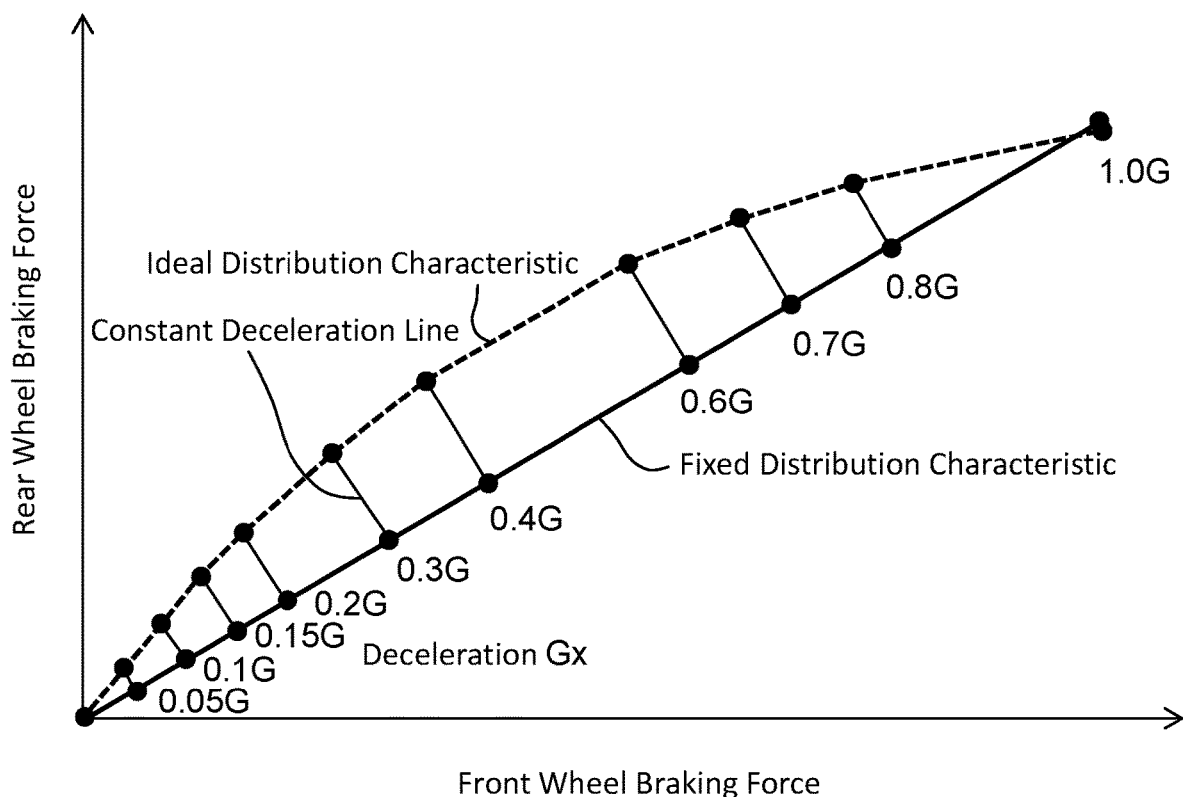
FIG. 4 is a graph showing a fixed distribution characteristic and an ideal distribution characteristic used for comparison of braking force distribution characteristics.

Next, changes in the pitch angle θ and the heave amount H due to a change in the front-rear distribution ratio α will be described with reference to FIGS. 4 to 6. FIG. 4 is a graph showing a fixed distribution characteristic and an ideal distribution characteristic used for comparison of braking force distribution characteristics.

The "fixed distribution characteristic" referred to here is a braking force distribution characteristic that achieves the front-rear distribution ratio α that is constant regardless of the deceleration Gx of the vehicle 1. This fixed distribution characteristic is achieved, for example, by applying equal hydraulic pressure to the wheel cylinders 28a of the front wheels 2F and the rear wheels 2R. In general, according to the fixed distribution characteristic, a braking force distribution characteristic that is biased toward the front wheels 2F is obtained such that the front-rear distribution ratio α is 0.7, for example, due to a difference in brake specifications between the front and rear wheels.

Furthermore, the term "ideal distribution characteristic" referred to here is a braking force distribution characteristic that achieves a front-rear distribution ratio α at which the front wheels 2F and the rear wheels 2R are locked at the same time during braking. As shown in FIG. 4, in comparison at the same deceleration Gx, according to the ideal distribution characteristic, a braking force distribution characteristic that is biased toward the rear wheels 2R as a whole than the fixed distribution characteristic is obtained.

Figure 5:
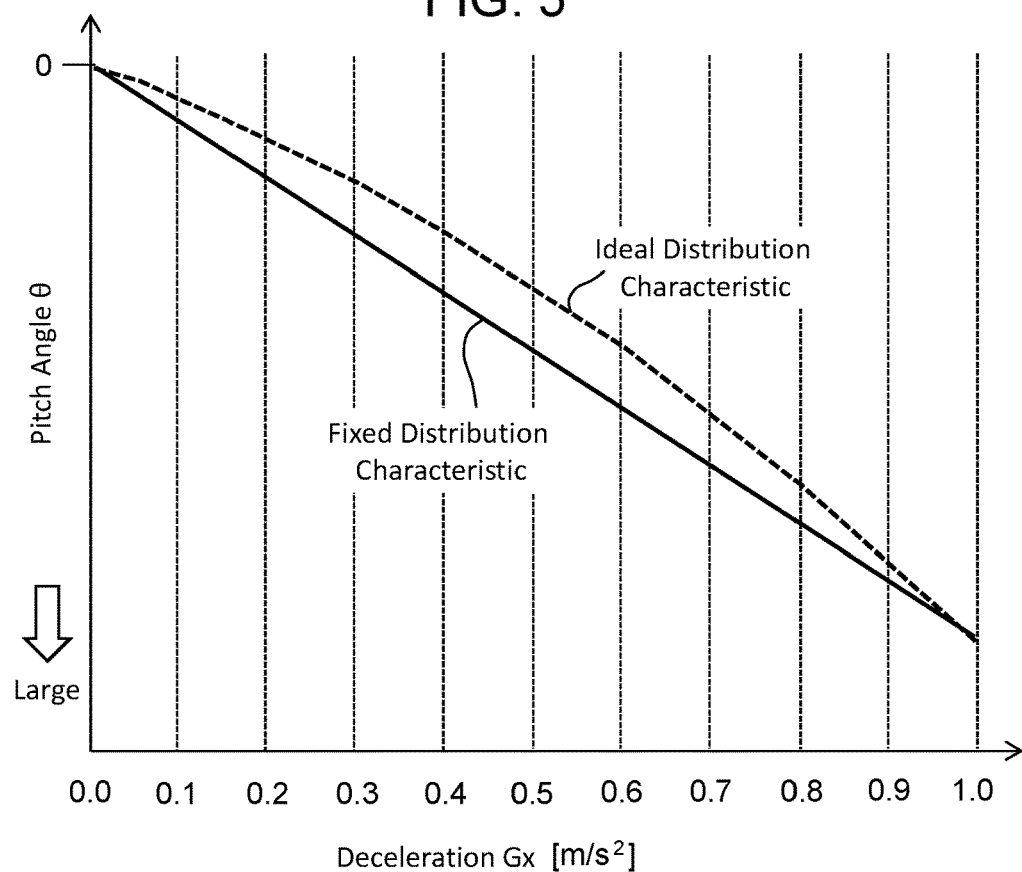
FIG. 5 is a graph showing characteristics of pitch angle $\theta$ with respect to deceleration Gx in comparison between the fixed distribution characteristic and the ideal distribution characteristic.

FIG. 5 is a graph showing the characteristics of the pitch angle θ with respect to the deceleration Gx in comparison between the fixed distribution characteristic and the ideal distribution characteristic. According to Equation (3), the pitch angle θ is calculated using the calculation results of the suspension displacement amounts $\Delta X_f$ and $\Delta X_r$ according to Equations (1) and (2). As a result, in the fixed distribution characteristic, the pitch angle θ monotonically increases with an increase in the deceleration Gx. On the other hand, as shown in FIG. 5, in the ideal distribution characteristic, the pitch angle θ is smaller as a whole than that in the fixed distribution characteristic. More specifically, in comparison at the same deceleration Gx, the difference in the pitch angle θ basically increases when the difference in the front-rear distribution ratio α increases. As described above, according to the ideal distribution characteristic, an increase in the pitch angle θ is reduced due to the braking force distribution that is biased toward the rear wheels 2R than in the fixed distribution characteristic.

Figure 6:
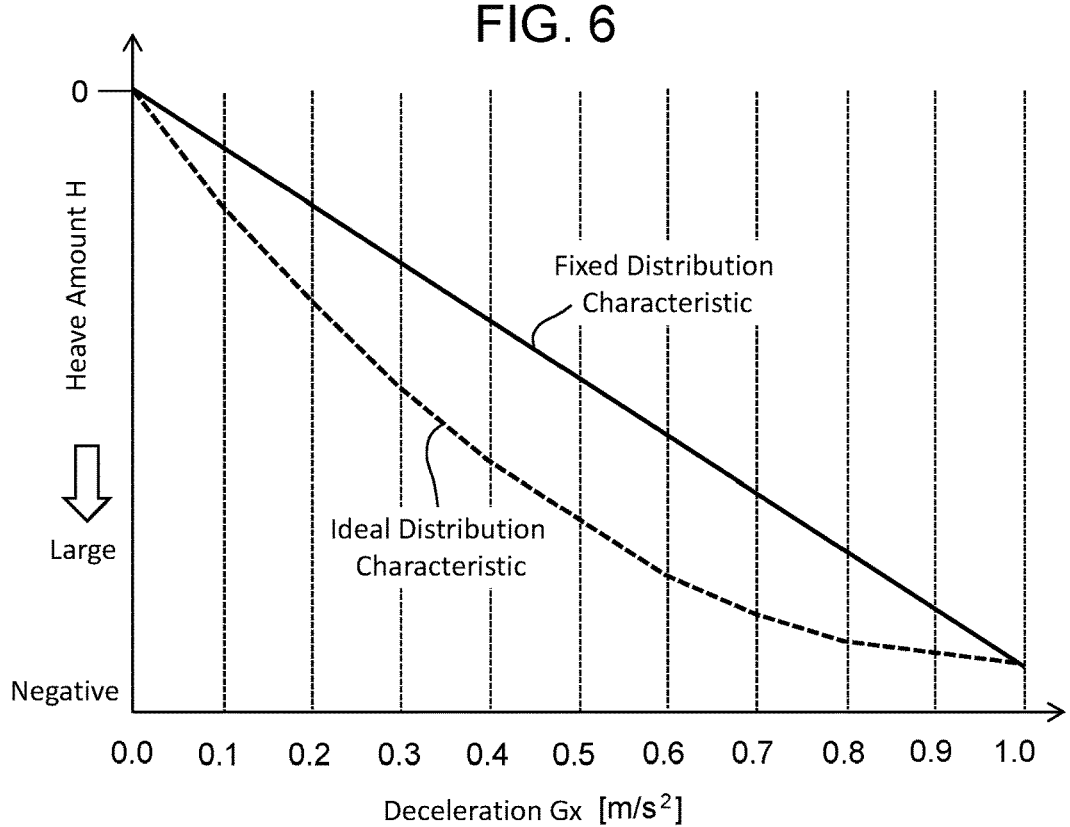
FIG. 6 is a graph showing characteristics of heave amount H at a position of the center of gravity with respect to the deceleration Gx in comparison between the fixed distribution characteristic and the ideal distribution characteristic.

FIG. 6 is a graph showing the characteristics of the heave amount H at the position of the center of gravity with respect to the deceleration Gx in comparison between the fixed distribution characteristic and the ideal distribution characteristic. According to Equation (4), the heave amount H is calculated using the calculation results of the suspension displacement amounts $\Delta X_f$ and $\Delta X_r$ according to Equations (1) and (2) and the calculation results of the pitch angle θ according to Equation (3). As a result, the heave amount H in the fixed distribution characteristic monotonically increases with an increase in the deceleration Gx. It should be noted that, in the example shown in FIG. 6, due to braking, the heave amount H takes a negative value, i.e., the vehicle body 5 is displaced downward.

On the other hand, as shown in FIG. 6, in the ideal distribution characteristic, the heave amount H is larger as a whole than that in the fixed distribution characteristic. More specifically, in comparison at the same deceleration Gx, the difference in the heave amount H basically increases when the difference in the front-rear distribution ratio α increases. As described above, in the ideal distribution characteristic, an increase in the heave amount H (i.e., diving of the vehicle body 5) is promoted due to the braking force distribution that is biased toward the rear wheels 2R than in the fixed distribution characteristic.

As can be seen from the description with reference to FIGS. 4 to 6, the pitch angle θ and the heave amount H during braking can be controlled by changing the front-rear distribution ratio α.

Figure 7A:
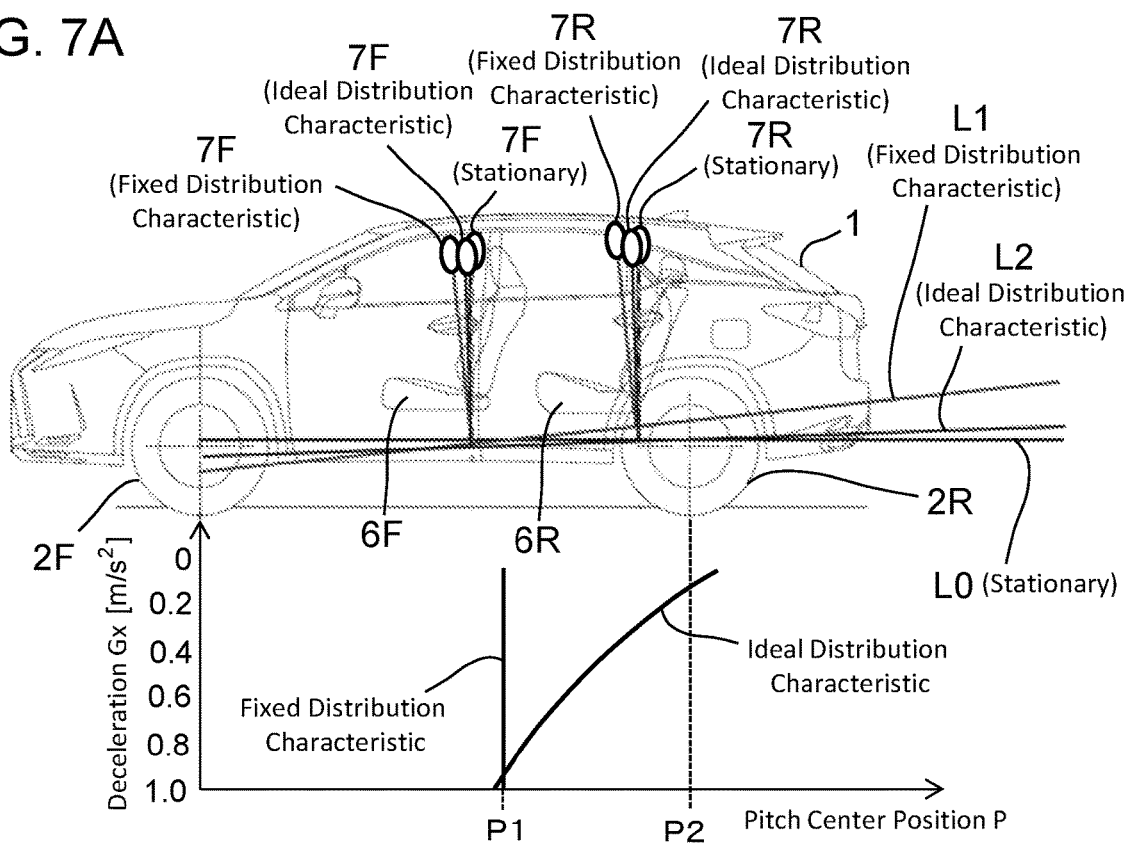
FIG. 7A is a diagram used to describe the influence of a front-rear distribution ratio $\alpha$ on a relation between pitch center position P and the deceleration Gx.
Figure 7B:
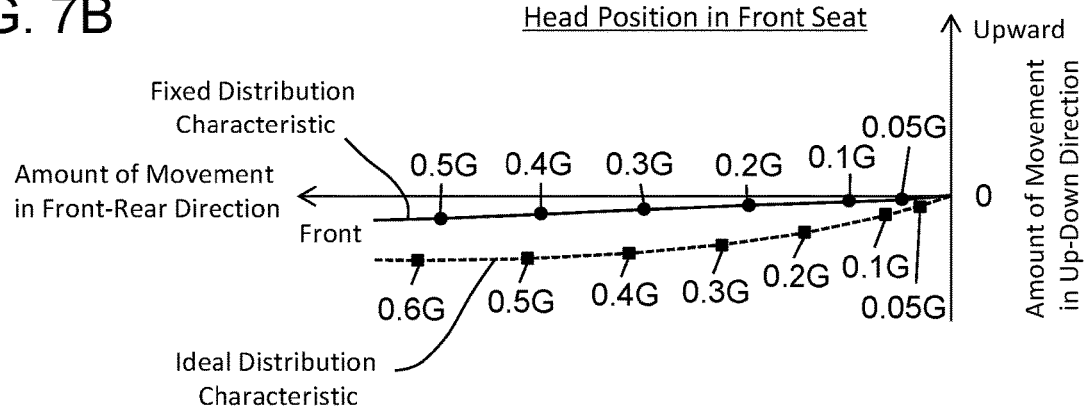
FIG. 7B is a diagram used to describe the influence of the front-rear distribution ratio $\alpha$ on the amount of movement of a head of a person in a front seat in a front-rear direction and an up-down direction of the vehicle.
Figure 7C:
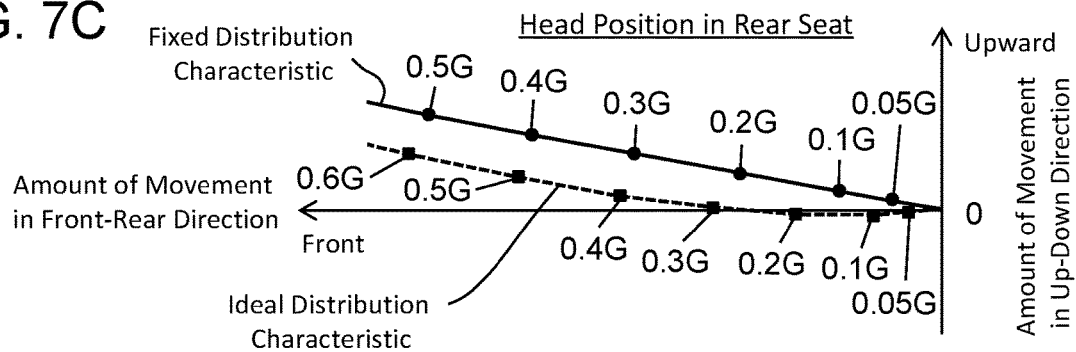
FIG. 7C is a graph used to describe the influence of the front-rear distribution ratio α on the amount of movement of a head of a person in a rear seat in the front-rear direction and the up-down direction.

Next, FIGS. 7A to 7C are a diagram and graphs used to describe, with respect to the head position of a person in the vehicle 1, the influence of the front-rear distribution ratio α on the change in the head position caused by the change in the pitch and the heave due to the braking. It should be noted that, in this description, the fixed distribution characteristic and the ideal distribution characteristic shown in FIG. 4 are used again for comparison of the braking force distribution characteristics.

FIG. 7A is a diagram used to describe the influence of the front-rear distribution ratio α on the relation between the pitch center position P and the deceleration Gx. In the fixed distribution characteristic in which the front-rear distribution ratio α is constant regardless of the deceleration Gx, a pitch center position P1 is constant regardless of the deceleration Gx. On the other hand, the pitch center position P in the ideal distribution characteristic changes in accordance with the deceleration Gx. More specifically, the pitch center position P in the ideal distribution characteristic is on the vehicle rear side as a whole compared to that in the fixed distribution characteristic, and approaches the pitch center position P1 in the fixed distribution characteristic when the deceleration Gx increases.

FIG. 7A shows a reference line L0 connecting the rotation center axes of the front wheels 2F and the rear wheels 2R when the vehicle 1 is stationary, a reference line L1 obtained when the fixed distribution characteristic is selected, and a reference line L2 obtained when the ideal distribution characteristic is selected. The reference line L1 indicates a change in the reference line with respect to the reference line L0 and is obtained when a pitch change occurs under a deceleration Gx. The reference line L2 indicates, for example, a change in the reference line with respect to the reference line L0 and is obtained when a pitch change occurs around a pitch center position P2 located on the rotation center axis of the rear wheels 2R. In addition, FIG. 7A shows a head 7F of a person in a front seat 6F and a head 7R of a person in a rear seat 6R. The positions of these heads 7F and 7R are shown in association with each of the three reference lines L0, L1, and L2.

As described with reference to FIG. 7A, the pitch center position P at the time of braking changes by changing the front-rear distribution ratio α. Also, in association with the change in the pitch center position P, the pitch posture of the vehicle body (i.e., sprung structure) 5 including a heave change (i.e., the vehicle braking posture) changes. As a result, as shown in the following FIGS. 7B and 7C, it is possible to change the amount of movement of the head positions of the persons in the front-rear direction and the up-down direction due to the braking.

FIG. 7B is a graph used to describe the influence of the front-rear distribution ratio α on the amount of movement of the head 7F of the person in the front seat 6F in the front-rear direction and the up-down direction. A plot point at which the deceleration Gx is 0.1 G is described as an example. In the fixed distribution characteristic, the amount of movement of the head 7F in the up-down direction is small, but the amount of movement in the front-rear direction is large. On the other hand, in the ideal distribution characteristic having the braking force distribution that is biased toward the rear wheels 2R, the amount of movement of the head 7F in the front-rear direction is reduced to be smaller than that in the fixed distribution characteristic.

FIG. 7C is a graph used to describe the influence of the front-rear distribution ratio α on the amount of movement of the head 7R of the person in the rear seat 6R in the front-rear direction and the up-down direction. Also, in this graph, a plot point at which the deceleration Gx is 0.1 G is described as an example. In the fixed distribution characteristic, the head 7R moves in the front direction and is lifted in the upward direction due to the braking. On the other hand, according to the ideal distribution characteristic, when compared to the fixed distribution characteristic, the amount of movement in the up-down direction is reduced and the amount of movement in the front-rear direction is also reduced to be small.

As shown in FIGS. 7B and 7C, the amount of movement of the heads 7F and 7R in the front-rear direction (more specifically, the amount of movement of the heads 7F and 7R to the front side) can be reduced by changing the front-rear distribution ratio α. In other words, a vehicle braking posture that is more comfortable and secure for the person in the front seat 6F can be achieved. Also, as shown in FIG. 7C, with respect to the rear seat 6R, the amount of movement of the head 7R in the up-down direction can be reduced by changing the front-rear distribution ratio α. This also leads to acquisition of a more comfortable and secure vehicle braking posture for the person in the rear seat 6R. Moreover, with respect to the front seat 6F, the amount of movement of the head 7F in the downward direction can be increased by changing the front-rear distribution ratio α. Thus, such a motion that the head 7F and the body dive downward can give the person a feeling of security that the vehicle 1 sticks to the road surface at the time of braking. This also leads to acquisition of a more comfortable and secure vehicle braking posture. Furthermore, with respect to the rear seat 6R, the amount of movement of the head 7R in the upward direction can be reduced by changing the front-rear distribution ratio α. Thus, such a motion that reduces the movement of the head 7R and the body in the upward direction also gives the person a feeling of security that the vehicle 1 sticks to the road surface at the time of braking.

1-2-2. Perception of Braking Feeling

Next, FIG. 8 is a diagram used to describe a temporal process from when the driver depresses the brake pedal 22 to when the driver obtains a braking feeling.

First, when depression of the brake pedal 22 by the driver is started at a time point t0, braking is started. Specifically, the brake pedal 22 is stroked by the depression force of the driver, and as a result, a hydraulic pressure is generated in the master cylinder 24. Then, a brake hydraulic pressure according to the hydraulic pressure generated in the master cylinder 24 acts on the wheel cylinders 28a. As a result, the brake pads are pressed against the brake discs to generate a braking torque, whereby a braking force is applied to the wheels 2. As a result, the suspension reaction forces such as the above-described anti-dive force are generated, and the deceleration Gx is generated in the vehicle body 5 (time point t1). The process up to this time point t1 is referred to as "absolute performance" as the vehicle 1 that is achieved by the braking function of the vehicle 1, and is distinguished from the subsequent "sensibility performance". This sensibility performance is a performance perceived by the five senses of a person onboard such as a driver.

When the deceleration Gx is generated, a load transfer occurs in the vehicle body (sprung structure) 5. Also, the sprung posture (i.e., vehicle posture) changes with the occurrence of the load transfer. The change in the sprung posture at this time is caused not only by the load transfer but also by the influence of the suspension reaction forces described above. A time point t2 at which a person onboard such as a driver actually receives the deceleration Gx as the braking feeling (i.e., feeling of deceleration) is delayed from the time point t1 at which the deceleration Gx is generated in the vehicle body 5. That is, it is considered that the person onboard obtains a braking feeling by a combination of the generation of the deceleration Gx of the vehicle body 5 and the change in the sprung posture.

More specifically, depending on how the sprung posture changes, the person onboard such as the driver may obtain a feeling of security with respect to the braking or, conversely, it may be difficult for the person to obtain a feeling of deceleration. In other words, controlling the vehicle braking posture by changing the front-rear distribution ratio α means that the feeling received by the person from braking can be changed.

Figure 9:
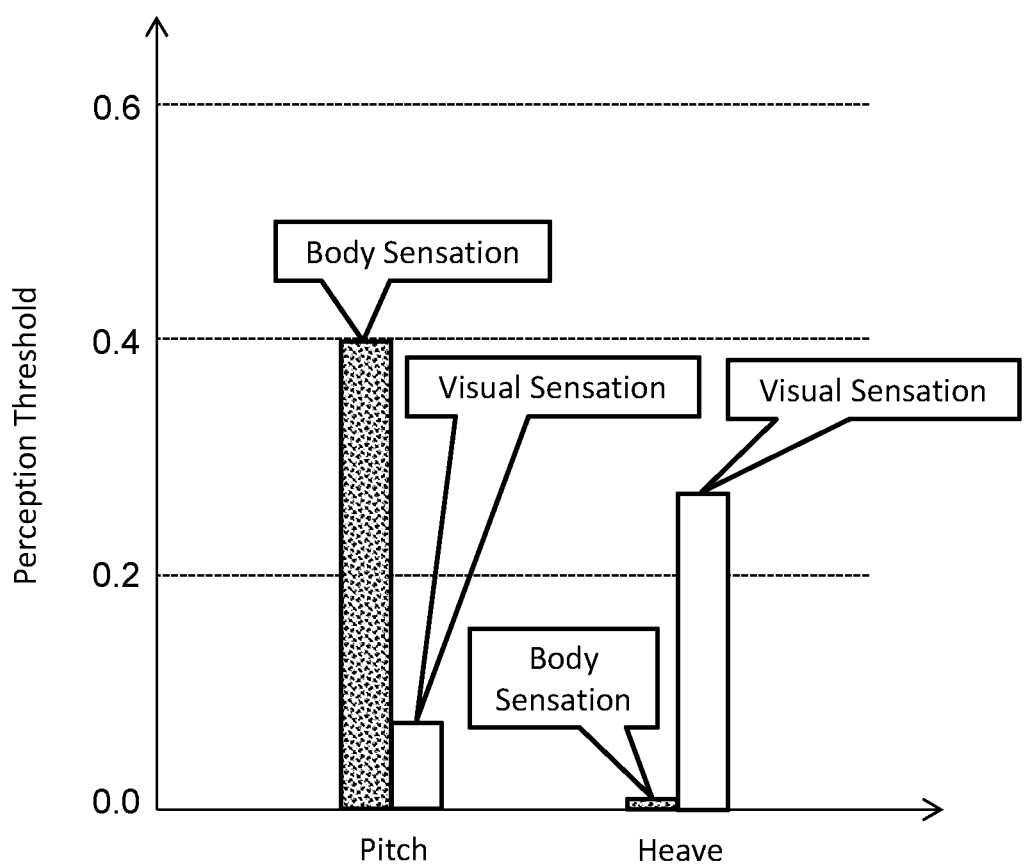
FIG. 9 is a graph used to describe perception thresholds of pitch motion and heave motion.

Next, FIG. 9 is a graph used to describe perception thresholds of pitch motion and heave motion. As described above, the vehicle motion related to the change in the vehicle braking posture includes the pitch motion and the heave motion. The perception threshold referred to here corresponds to a change amount (more specifically, a change speed or a change acceleration) of each motion required for a person to perceive a pitch change or a heave change, and is evaluated by, for example, a test in advance.

FIG. 9 shows illustrates perception thresholds related to visual perception and sensory perception for each motion. For example, the perceptions are related to a change in acceleration. The smaller the value of the perception threshold is, the easier it is for a person to perceive the vehicle motion. Therefore, it can be seen from FIG. 9 that the pitch change is more easily perceived by the visual sensation than by the bodily sensation. That is, it can be understood that a person onboard such as a driver easily feels the pitch change by the change of the visual sensation. On the other hand, it can be seen that the heave change is more easily perceived by the bodily sensation than by the visual sensation. That is, it is understood that the person onboard such as the driver easily feels the heave change from the bodily sensation of a change in the vehicle vertical acceleration, for example.

Figure 10:
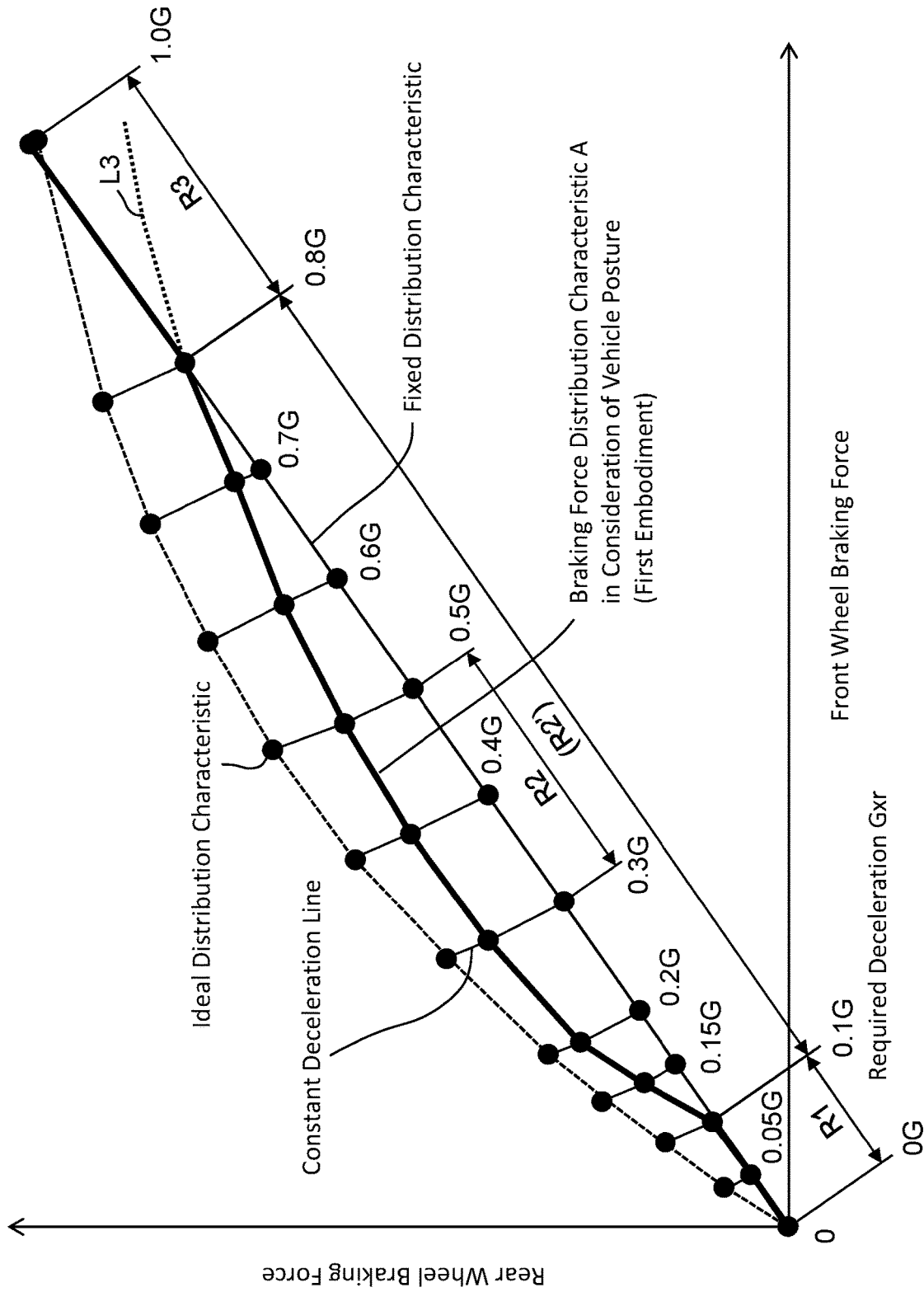
FIG. 10 is a graph used to describe a braking force distribution characteristic A used in the first embodiment.

1-2-3. Braking Force Distribution Control in Consideration of Vehicle Posture FIG. 10 is a graph used to describe a braking force distribution characteristic A used in the first embodiment. FIG. 10 also shows the same fixed distribution characteristic and ideal distribution characteristic as those shown in FIG. 4 for comparison with the braking force distribution characteristic A.

As described above, a person in the vehicle 1 obtains the braking feeling not only by the generation of the deceleration Gx but also by the combination of the generation of the deceleration Gx and the change in the vehicle posture. Therefore, in order to improve the braking feeling (more specifically, for example, the deceleration feeling and the feeling of security against braking), it is effective to cause the person to perceive a change in the vehicle braking posture that causes a visual sensation change or a bodily sensation change of the person that leads to the improvement of the braking feeling.

Furthermore, the change in the vehicle braking posture which leads to the improvement of the braking feeling differs depending on the range of the deceleration Gx. To be more specific, attention is paid to a low deceleration range R1 and a medium deceleration range R2 that are related to a required deceleration Gxr from the driver. It should be noted that the low deceleration range R1 and the medium deceleration range R2 correspond to examples of a "first range" and a "second range" according to the present disclosure, respectively.

The low deceleration range R1 is a required deceleration range below a lower limit value $Gx_{LMT}$ of the deceleration Gx perceivable by a person onboard such as a driver. The lower limit value $Gx_{LMT}$ is a value that can be grasped in advance by, for example, a test, and is, for example, 0.1 G. Alternatively, the lower limit value $Gx_{LMT}$ may be, for example, 0.15 G. In this kind of low deceleration range R1, the driver does not feel the deceleration Gx or is at least less likely to feel the deceleration Gx. However, if it is possible to cause the driver to perceive the occurrence of the pitch change during braking that uses the low deceleration range R1, the following effect can be obtained.

That is, the driver empirically knows that the body including the head 7F is going to move forward when the brake pedal 22 is depressed. Also, according to the perception threshold shown in FIG. 9, a pitch change is easily perceived by using a change in visual sensation. Therefore, if a pitch change is actively caused as the change in such a vehicle braking posture that the driver can quickly perceive the occurrence of the pitch change even if the driver does not feel the deceleration Gx, the driver can be given a feeling of deceleration earlier than the perception of the deceleration by using a change in visual sensation accompanying the pitch change.

Therefore, according to the braking force distribution characteristic A, in the low deceleration range R1, as shown in FIG. 10, the brake device 20 is controlled such that the front-rear distribution ratio α is in accordance with the fixed distribution characteristic. In other words, in the low deceleration range R1, the brake device 20 is controlled such that the front-rear distribution ratio α is biased toward the front wheels 2F than that in the ideal distribution characteristic.

Moreover, the medium deceleration range R2 is a required deceleration range from 0.3 G to 0.5 G, for example. Alternatively, the medium deceleration range R2 may be a required deceleration range from 0.3 G to 0.6 G, for example. According to the braking force distribution characteristic A, in the middle deceleration range R2, as shown in FIG. 10, the brake device 20 is controlled such that the front-rear distribution ratio α is biased toward the rear wheels 2R than that in the fixed distribution characteristic.

According to the braking force distribution characteristic A, in the middle deceleration range R2, as shown in FIG. 10, the front-rear distribution ratio α is controlled at values located between the ideal distribution characteristic and the fixed distribution characteristic. Also, according to the braking force distribution characteristic A, in the required deceleration range located between the low deceleration range R1 and the medium deceleration range R2, the front-rear distribution ratio α is changed so as to be gradually biased toward the rear wheels 2R with an increase in the required deceleration Gxr, from the value of the front-rear distribution ratio α in the range R1 toward the value of the front-rear distribution ratio α in the range R2.

Furthermore, a high deceleration range R3 exists on the higher deceleration side than the medium deceleration range R2. The high deceleration range R3 is a required deceleration range equal to or higher than the deceleration Gx obtained when the distribution line of the braking force distribution characteristic A and the distribution line of the fixed distribution characteristic intersect at the high deceleration side. Therefore, in the example shown in FIG. 10, the high deceleration range R3 is a required deceleration range equal to or higher than 0.8 G. Alternatively, the high deceleration range R3 may be, for example, a required deceleration range equal to or higher than 0.7 G. The upper limit of the high deceleration range R3 is, for example, 1.0 G. According to the braking force distribution characteristic A, in the high deceleration range R3, as shown in FIG. 10, the brake device 20 is controlled such that the front-rear distribution ratio α is in accordance with the fixed distribution characteristic. It should be noted that the high deceleration range R3 corresponds to an example of a "third range" according to the present disclosure.

According to the braking force distribution characteristic A, in the required deceleration range located between the medium deceleration range R2 and the high deceleration range R3, the front-rear distribution ratio α is changed so as to be gradually biased toward the front wheels 2F with an increase in the required deceleration Gxr, from the value of the front-rear distribution ratio α in the range R2 toward the value of the front-rear distribution ratio α in the range R3.

In addition, in each of the low deceleration range R1 and the high deceleration range R3, "controlling the brake device 20 so as to achieve the front-rear distribution ratio α along the fixed distribution characteristic" does not necessarily require that the front-rear distribution ratio α is controlled so as to completely coincide with the fixed distribution characteristic, but includes controlling the brake device 20 so as to achieve the front-rear distribution ratio α substantially along the fixed distribution characteristic.

Figure 11:
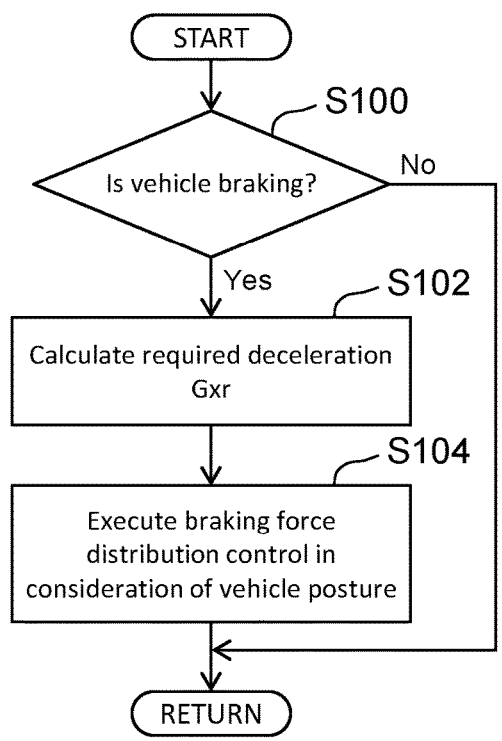
FIG. 11 is a flowchart showing processing related to a braking force distribution control according to the first embodiment.

Next, FIG. 11 is a flowchart showing processing related to the braking force distribution control according to the first embodiment. It should be noted that the processing of this flowchart is repeatedly executed while the vehicle 1 is traveling.

In FIG. 11, in step S100, the ECU 40 determines whether or not the vehicle 1 is braking. This determination can be made based on, for example, whether or not the amount of depression of the brake pedal 22 detected by the brake position sensor 46 is equal to or greater than a designated threshold value.

As a result, when it is determined in step S100 that the vehicle 1 is not braking, the processing proceeds to RETURN. When, on the other hand, the vehicle 1 is braking, the processing proceeds to step S102. In step S102, the ECU 40 calculates a required deceleration Gxr. The required deceleration Gxr is calculated based on, for example, the amount of depression of the brake pedal 22. Alternatively, the required deceleration Gxr may be calculated based on, for example, the master cylinder pressure.

Next, in step S104, the ECU 40 executes the braking force distribution control in consideration of the vehicle posture. The storage device of the ECU 40 stores, as a map, the braking force distribution characteristic A (see FIG. 10) specified based on a relation among the front wheel braking force, the rear wheel braking force, and the required deceleration Gxr. The ECU 40 calculates a target front wheel braking force and a target rear wheel braking force according to the current required deceleration Gxr from this kind of map.

Then, the ECU 40 controls the brake device 20 so as to generate the calculated target front wheel braking force and target rear wheel braking force. More specifically, as described above, in the present embodiment, the ratios (more specifically, the regenerative distribution ratios) β and γ are constant as an example. The target front wheel braking force is distributed to a target front wheel friction braking force and a target front wheel regenerative braking force in accordance with the ratio β. The target rear wheel braking force is distributed to a target rear wheel friction braking force and a target rear wheel regenerative braking force in accordance with the ratio γ. The ECU 40 controls the brake device 20 including the regenerative brake device 34 so as to generate these target friction braking forces and target regenerative braking forces.

In other words, the braking force distribution characteristic A defines the front-rear distribution ratio α according to the required deceleration Gxr. Therefore, controlling the front wheel braking force αF and the rear wheel braking force (1-α)F using the map described above means controlling the front-rear distribution ratio α in accordance with the required deceleration Gxr.

In addition, in step S104, instead of the map described above, for example, a map that directly defines the relation between the required deceleration Gxr and the front-rear distribution ratio α that is specified by the braking force distribution characteristic A (see FIG. 10) may be used. Also, the ECU 40 may calculate a target braking force Ft which is a target value of the total braking force F based on, for example, the amount of depression of the brake pedal 22 or the master cylinder pressure. Then, the ECU 40 may calculate the target front wheel braking force and the target rear wheel braking force from the calculated target braking force Ft and the front-rear distribution ratio α that is calculated from the map according to the required deceleration Gxr.

Figure 12:
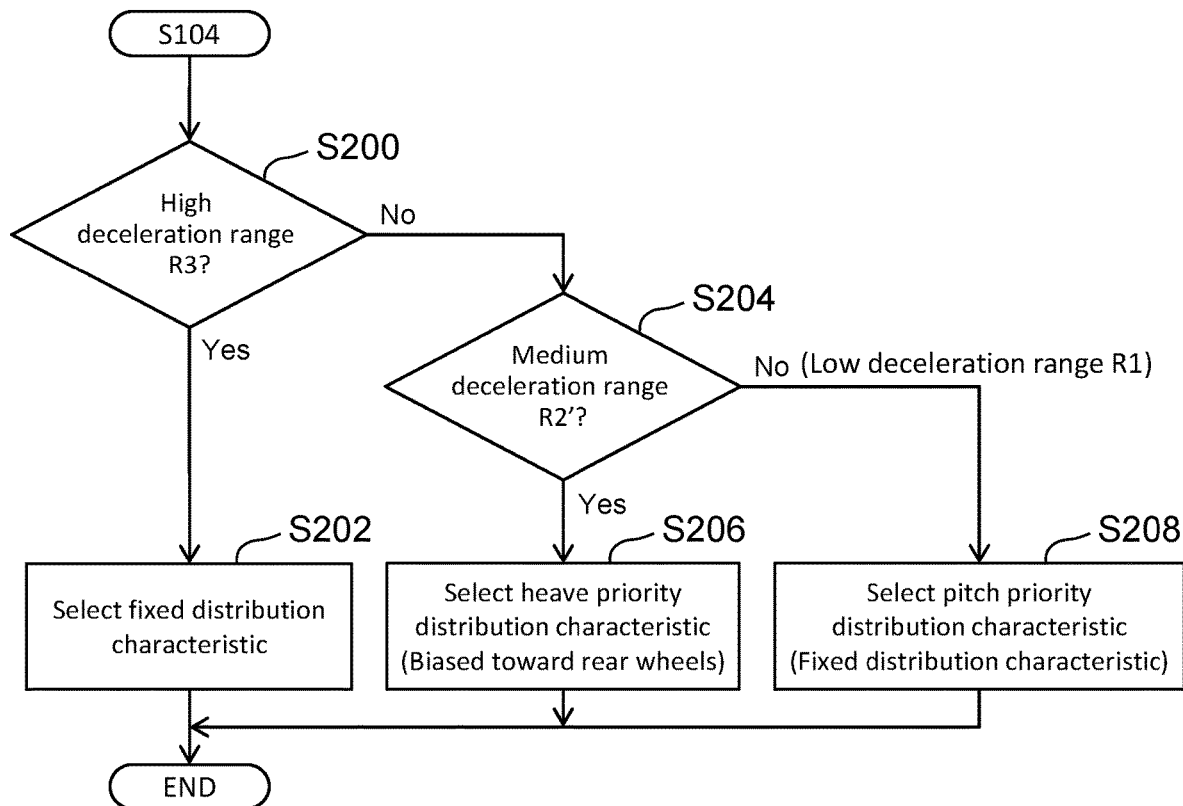
FIG. 12 is a flowchart showing a modification example of processing of step S104.

Furthermore, the processing of step S104 related to the braking force distribution control may be executed as follows, for example. FIG. 12 is a flowchart showing a modification example of the processing of step S104.

In FIG. 12, in step S200, the ECU 40 determines whether or not the required deceleration Gxr is within the high deceleration range R3. As a result, when this determination result is Yes, in step S202 the ECU 40 selects the fixed distribution characteristic (for example, see FIG. 10).

On the other hand, when the determination result of step S200 is No, the ECU 40 determines in step S204 whether or not the required deceleration Gxr is within a medium deceleration range R2'. The medium deceleration range R2' (see FIG. 10) referred to here includes not only the medium deceleration range R2 but also a required deceleration range located between the medium deceleration range R2 and the low deceleration range R1 and a required deceleration range located between the medium deceleration range R2 and the high deceleration range R3. The medium deceleration range R2' corresponds to another example of the "second range" according to the present disclosure. That is, the "second range" only needs to include the medium deceleration range R2 specified as the required deceleration range of, for example, 0.3 G to 0.5 G or 0.3 G to 0.6 G. Therefore, the second range may be regarded as a range continuous with both the low deceleration range R1 and the high deceleration range R3 as in the medium deceleration range R2', or may be regarded as a range continuous with only one of the ranges R1 and R3.

When the determination result of step S204 is Yes, in step S206 the ECU 40 selects a heave priority distribution characteristic. This heave priority distribution characteristic gives priority to promotion of the heave change in the downward direction of the vehicle 1 over reduction of the pitch change, and is achieved by the front-rear distribution ratio α biased toward the rear wheels 2R than the fixed distribution characteristic as shown in FIG. 10.

On the other hand, when the determination result of step S204 is No, that is, when the required deceleration Gxr is within the low deceleration range R1, in step S208 the ECU 40 selects a pitch priority distribution characteristic. This pitch priority distribution characteristic gives priority to promotion of the pitch change over promotion of the heave change in the downward direction of the vehicle 1, and is achieved by the front-rear distribution ratio α according to the fixed distribution characteristic as shown in FIG. 10.

As described above, the processing of step S104 may be executed such that the braking force distribution characteristic is switched in accordance with the determination result of the range of the required deceleration Gxr as in the processing shown in FIG. 12.

1-3. Effect

As described above, according to the braking force distribution characteristic A (see FIG. 10) of the first embodiment, in the low deceleration range R1, the brake device 20 is controlled such that the front-rear distribution ratio α is in accordance with the fixed distribution characteristic.

Figure 13:
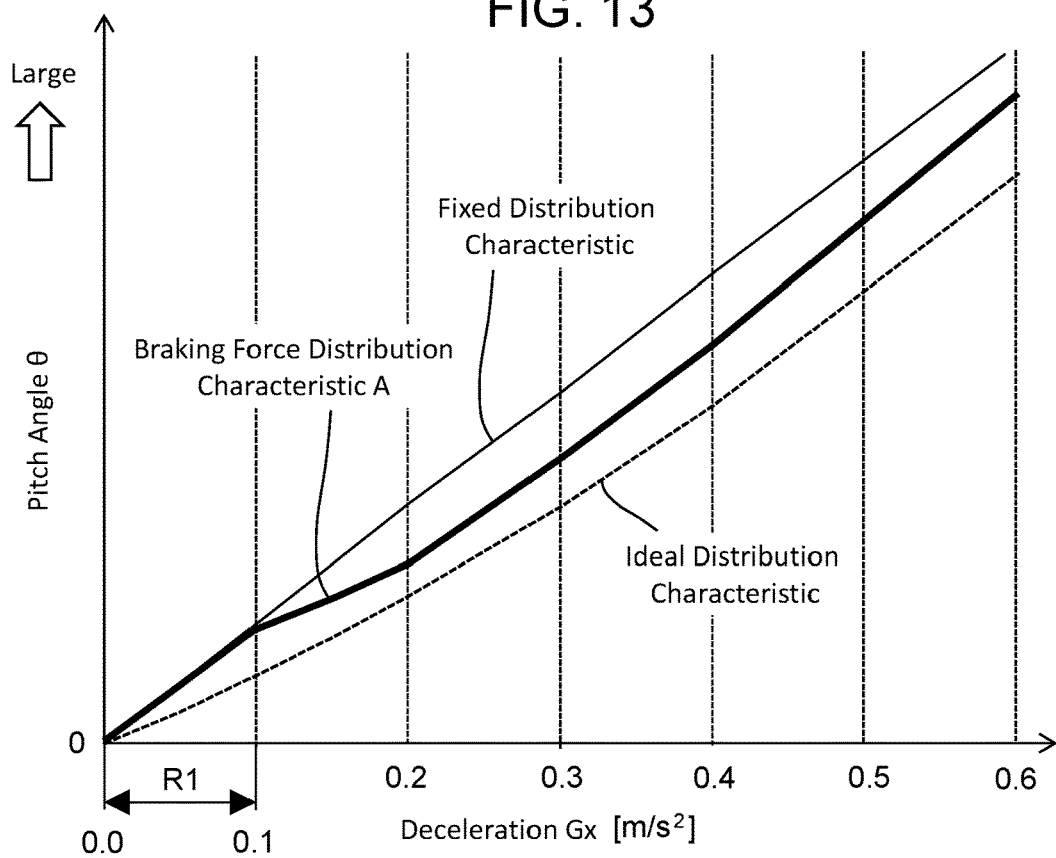
FIG. 13 is a graph showing a relation between the pitch angle θ and the deceleration Gx according to the first embodiment in comparison between braking force distribution characteristics.

FIG. 13 is a graph showing a relation between the pitch angle θ and the deceleration Gx according to the first embodiment in comparison between the braking force distribution characteristics. According to the braking force distribution characteristic A, as shown in FIG. 13, the pitch angle θ in the low deceleration range R1 is equal to the value obtained by the fixed distribution characteristic. That is, the pitch angle θ can be made larger than the value obtained by the ideal distribution characteristic. By actively generating a pitch change in comparison with the ideal distribution characteristic as described above, the pitch change can be quickly transmitted to a person onboard such as a driver through the visual sensation. Therefore, in the low deceleration range R1 in which the deceleration Gx during braking is low, it is possible to give the person onboard such as the driver with a deceleration feeling at an early stage. More specifically, by using the perception of a change in the visual sensation due to the movement of the head 7F caused by the pitch change, it is possible to give the driver with a good deceleration feeling that the response of the vehicle 1 to the operation of the brake pedal 22 is good, before the driver perceives the deceleration Gx. This leads to an improvement in the driver's feeling of security with respect to the braking performance.

Moreover, according to the braking force distribution characteristic A, in the medium deceleration range R2, the brake device 20 is controlled such that the front-rear distribution ratio α is biased toward the rear wheels 2R than the fixed distribution characteristic.

Figure 14:
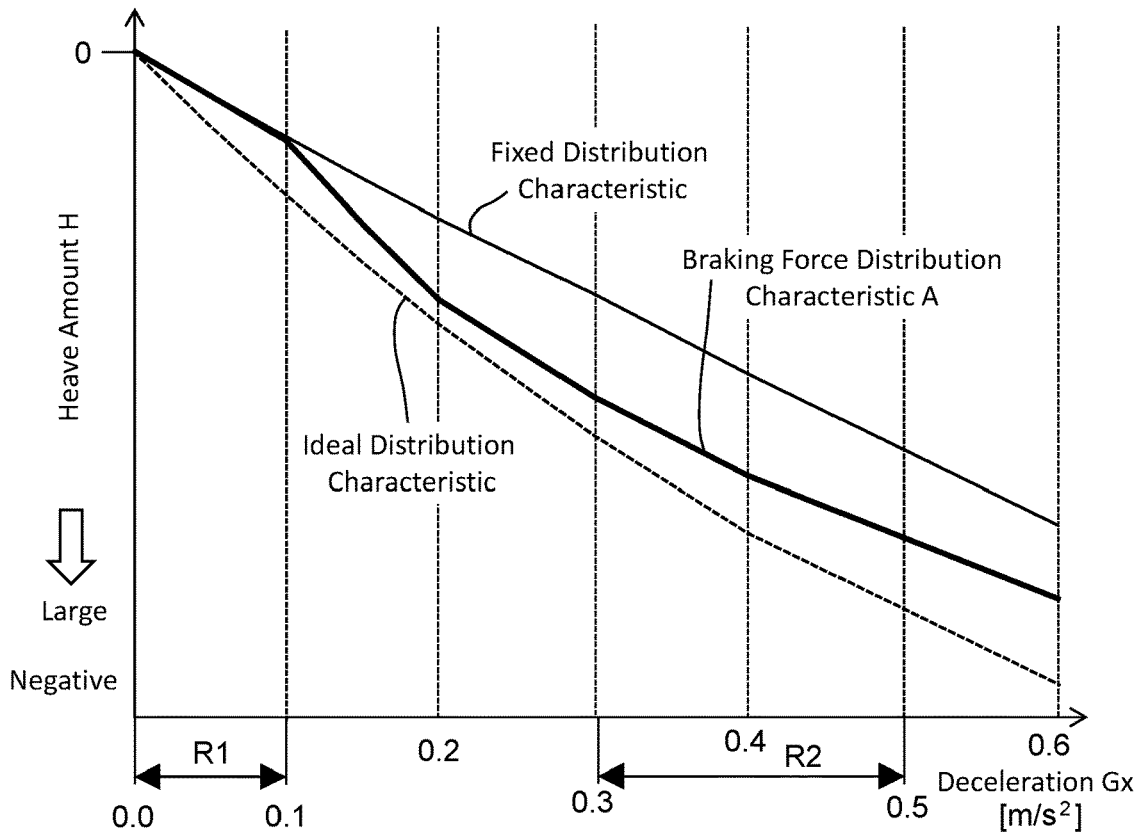
FIG. 14 is a graph showing a relation between the heave amount H and the deceleration Gx according to the first embodiment in comparison between braking force distribution characteristics.

FIG. 14 is a graph showing a relation between the heave amount H and the deceleration Gx according to the first embodiment in comparison between the braking force distribution characteristics. According to the braking force distribution characteristic A, as shown in FIG. 14, the heave amount H in the middle deceleration range R2 can be made larger than the value obtained by the fixed distribution characteristic. The heave change is transmitted to a person, such as a driver, as a change in the acceleration in the up-down direction of the vehicle 1. Also, as described with reference to FIG. 9, the heave change is easily perceived by the bodily sensation of the person onboard. Therefore, by actively increasing the heave amount H (i.e., diving of the vehicle body 5) in the middle deceleration range R2 as compared to the fixed distribution characteristic, it is possible to give the person onboard with a feeling of security that each wheel 2 of the vehicle 1 sticks to the road surface (i.e., a feeling of security against braking).

In addition, as can be seen from FIG. 14, the ideal distribution characteristic can also be used to increase the heave change in the middle deceleration range R2. However, according to the ideal distribution characteristic, even in the low deceleration range R1, the front-rear distribution ratio α is biased toward the rear wheels 2R than that in the fixed distribution characteristic. For this reason, according to the ideal distribution characteristic, it is not possible to obtain the effect of giving the driver the feeling of deceleration at an early stage by actively generating a pitch change in the low deceleration range R1 (see FIG. 13). Accordingly, in the braking force distribution characteristic A, the front-rear distribution ratio α is changed between the low deceleration range R1 and the medium deceleration range R2. As a result, a good braking force distribution characteristic is achieved in which the deceleration feeling can be improved in the low deceleration range R1 and the feeling of security against braking can be improved in the middle deceleration range R2. As described above, according to the first embodiment, the braking feeling can be favorably improved in a plurality of deceleration ranges (i.e., R1 and R2).

Additionally, the middle deceleration range R2 is a range in which the driver easily feels the deceleration Gx because the middle deceleration range R2 is on the higher deceleration side than the low deceleration range R1. According to the braking force distribution characteristic A, in this middle deceleration range R2, the pitch angle θ is reduced to be smaller than when the fixed distribution characteristic is selected (see FIG. 13).

Furthermore, according to the braking force distribution characteristic A, in the high deceleration range R3, the brake device 20 is controlled such that the front-rear distribution ratio α is in accordance with the fixed distribution characteristic. If the braking force distribution characteristic A has a characteristic as indicated by a broken line L3 in FIG. 10, the front-rear distribution ratio α becomes biased toward the front wheels 2F than the fixed distribution characteristic in the high deceleration range R3. As a result, the braking load on the front wheels 2F increases. On the other hand, according to the braking force distribution characteristic A, in the high deceleration range R3, the load on the front wheel braking force can be reduced as compared to the characteristic of the broken line L3. Therefore, the reduction of the brake fade on the front wheel side and the securement of the understeer characteristic during braking can be satisfactorily achieved.

It should be noted that, in the example of the braking force distribution characteristic A shown in FIG. 10, the brake device 20 is controlled such that the front-rear distribution ratio α is in accordance with the fixed distribution characteristic in the entire low deceleration range R1 (first range). Instead of this example, with only a part of the low deceleration range R1 (first range) as a target, the brake device 20 may be controlled such that the front-rear distribution ratio α is in accordance with the fixed distribution characteristic in order to actively generate a pitch change to give a person onboard a feeling of deceleration at an early stage.

2. Second Embodiment

In the first embodiment described above, the ratios (more specifically, the regenerative distribution ratios) β and γ are constant. A second embodiment differs from the first embodiment in that the ratios β and γ are changed in accordance with the deceleration Gx.

Specifically, in a braking force distribution control in consideration of the vehicle posture according to the second embodiment, as in the first embodiment, the braking force distribution characteristic A (see FIG. 10) is used for changing the front-rear distribution ratio α in accordance with the required deceleration Gxr. Also, in the vehicle 1 in which the regenerative torques of the electric motors 10F and 10R are applied to the front wheels 2F and the rear wheels 2R via the drive shafts 3F and 3R, respectively, the vehicle braking posture can also be changed by changing the ratios β and γ.

Figure 17:
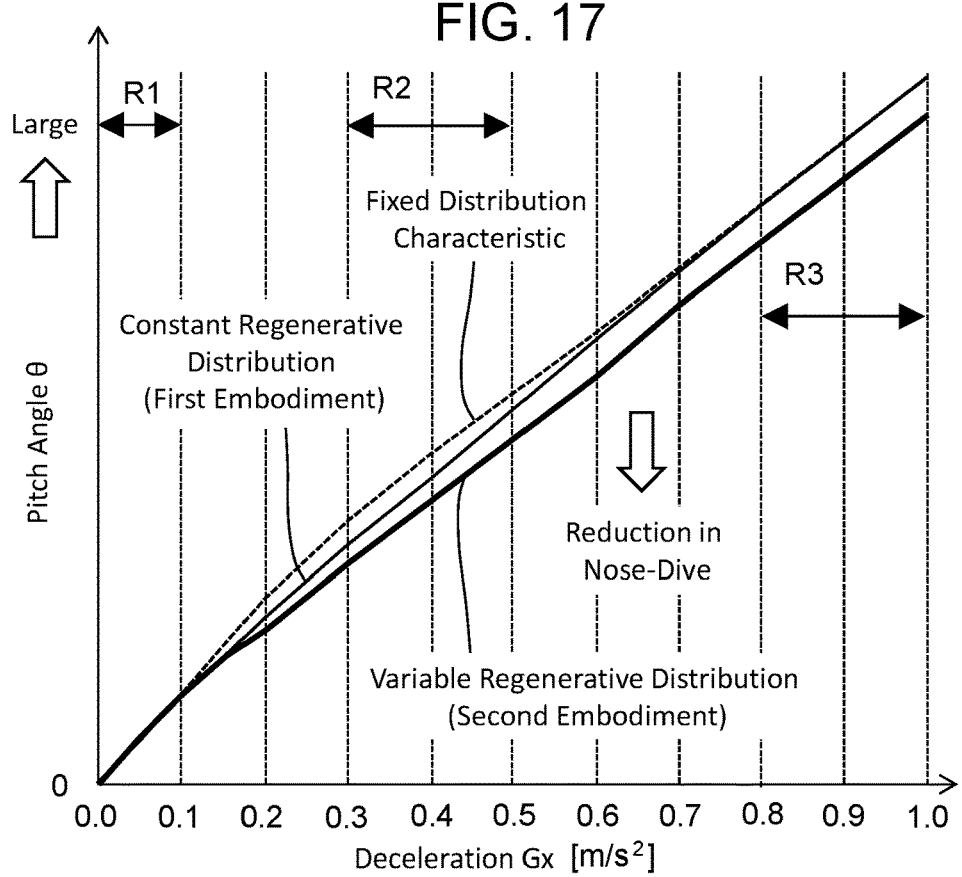
FIG. 17 is a graph showing a relation between the pitch angle θ and the deceleration Gx according to the second embodiment in comparison between braking force distribution characteristics.
Figure 18:
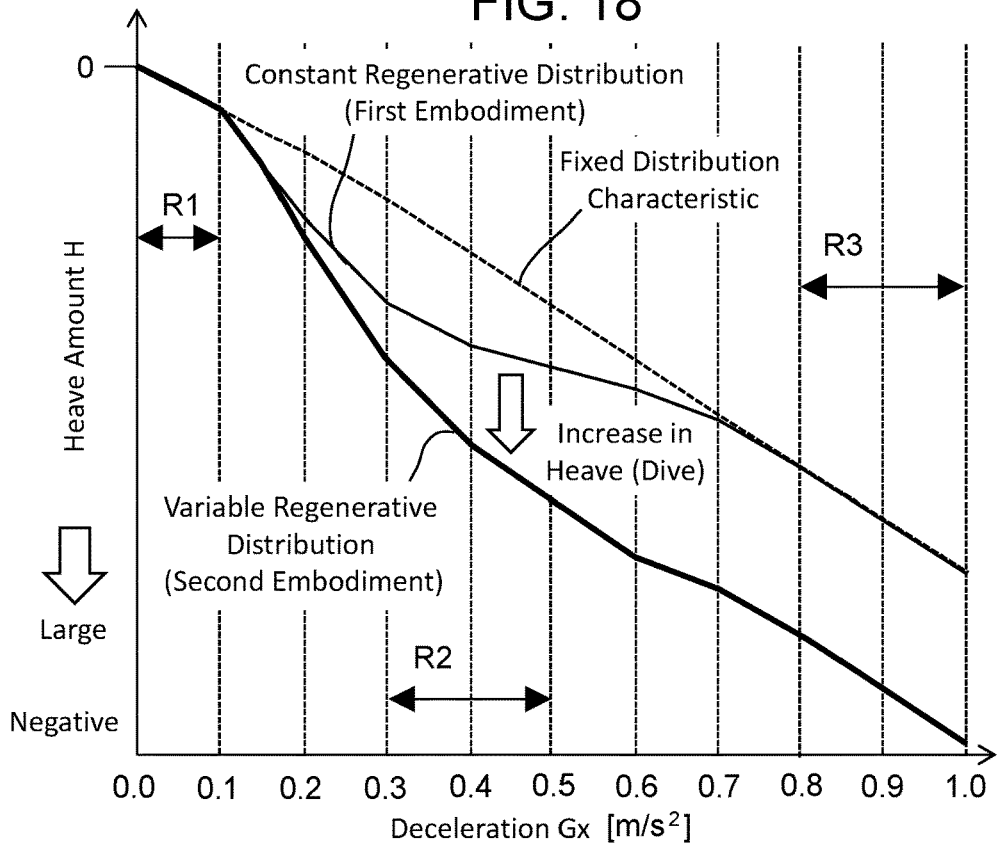
FIG. 18 is a graph showing a relation between the heave amount H and the deceleration Gx according to the second embodiment in comparison between braking force distribution characteristics.

As a result of considering the anti-lift rate and the anti-squat rate of general vehicles with respect to Equations (1) to (5) described above, it has been found that the variable ranges of the pitch angle θ and the heave amount H are improved when the braking force is generated by the hydraulic pressure with the rate γ lowered as shown in FIGS. 17 and 18 described below with respect to the rear wheels 2R.

Accordingly, in the second embodiment, the brake device 20 is controlled such that, in the required deceleration range on the higher deceleration side than the low deceleration range R1, the ratio β (i.e., the ratio of the front wheel regenerative braking force to the front wheel braking force) is larger and the ratio γ (i.e., the ratio of the rear wheel regenerative braking force to the rear wheel braking force) is smaller than in the low deceleration range R1. It should be noted that the ratios β and γ correspond to examples of the "first ratio" and the "second ratio" according to the present disclosure, respectively.

Figure 15:
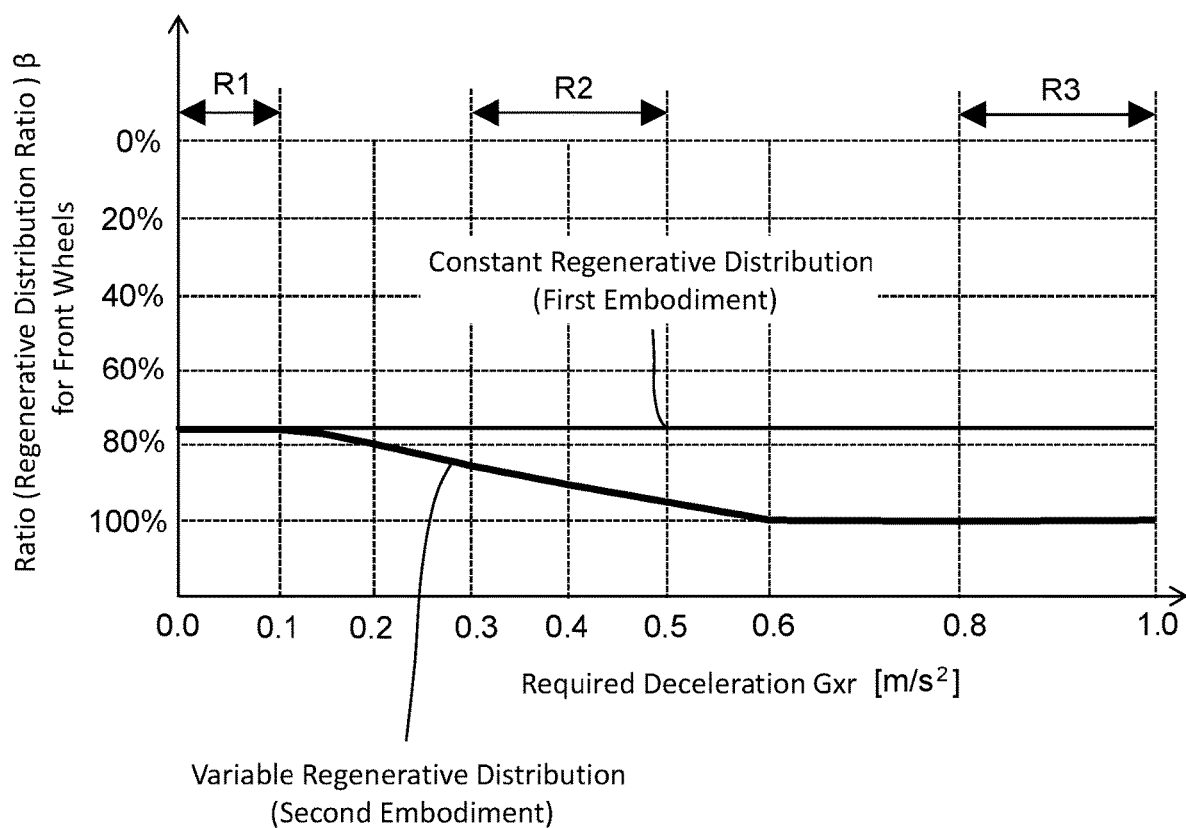
FIG. 15 is a graph illustrating an example of a relation between a required deceleration Gxr and a ratio β for front wheels according to a second embodiment.

FIG. 15 is a graph illustrating an example of a relation between the required deceleration Gxr and the ratio β for the front wheels 2F according to the second embodiment. A thin line in FIG. 15 is associated with the first embodiment in which a constant ratio β is used regardless of the required deceleration Gxr. A numerical value for the ratio β of 75% is an example.

In the second embodiment, the ratio β is varied as indicated by a thick line in FIG. 15. That is, in the low deceleration range R1, the ratio β is constant at 75%, for example. Also, when the required deceleration Gxr is equal to or greater than 0.1 G (i.e., after the required deceleration Gxr exceeds the low deceleration range R1), the ratio β increases from 75% with an increase in the required deceleration Gxr, and then reaches 100% at 0.6 G. In the required deceleration range equal to or higher than 0.6 G, the ratio β is constant at 100%. It should be noted that, unlike the example shown in FIG. 15, the ratio β may be changed so as to reach 100% at any value (including 1.0 G) of the required deceleration Gxr other than 0.6 G. In addition, the maximum value of the variable ratio β is not necessarily limited to 100%.

Moreover, in the second embodiment, the ratio γ is determined so as to be equal to a value obtained by subtracting the ratio β from 1 (γ=1-β). Therefore, according to the example shown in FIG. 15, the ratio γ is changed within the range of 0.25 (25%) to 0 (0%) in conjunction with the change of the ratio β within the range of 0.75 (75%) to 1.0 (100%) described above.

Basically, the ratio γ for the rear wheels 2R can be changed independently of the ratio β. Therefore, unlike the example described above, the increase in the ratio β and the decrease in the ratio γ with respect to the increase in the required deceleration Gxr may be performed independently of each other. However, by performing the increase in the ratio β and the decrease in the ratio γ in conjunction with each other as in the example described above, the following effect can also be obtained. That is, it is possible to secure a regenerative electric energy equivalent to the regenerative electric energy obtained at each deceleration Gx in the example in which the ratios β and γ are constant regardless of the deceleration Gx, and to increase the variable range of the vehicle braking posture.

Figure 16A:
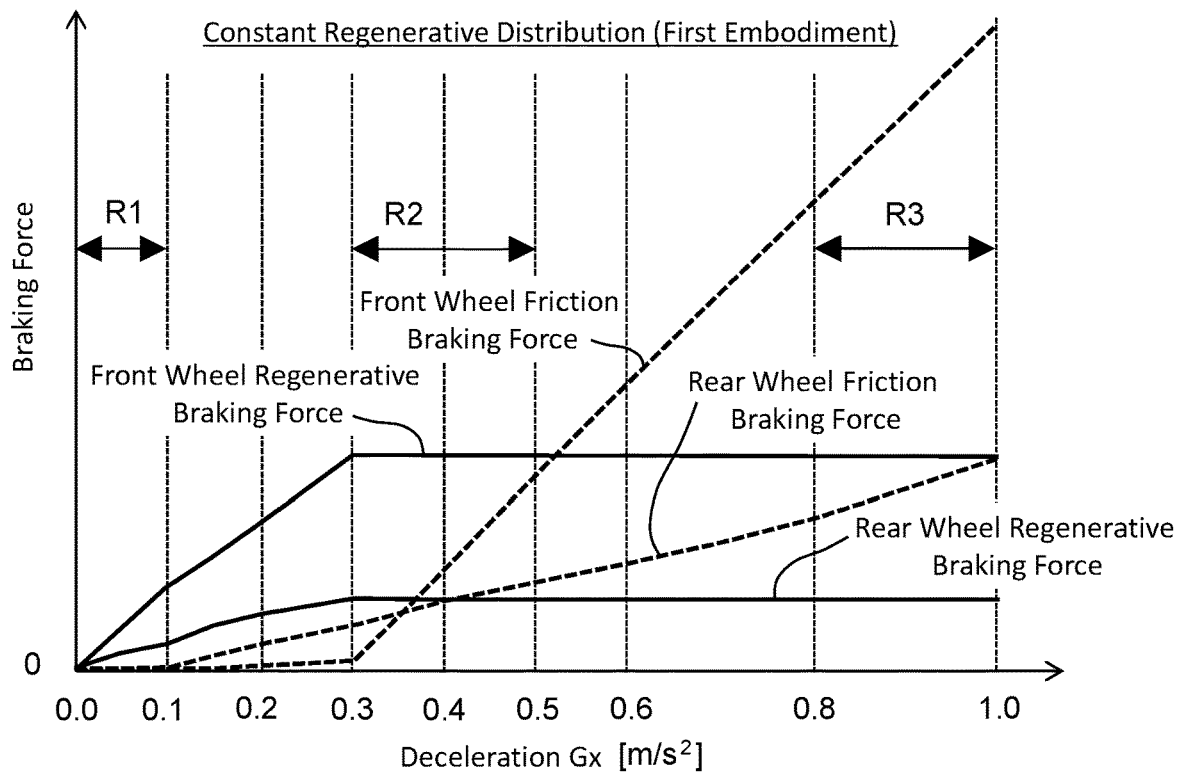
FIG. 16A is a graph illustrating a relation between individual braking forces and the deceleration Gx according to the second embodiment.
Figure 16B:
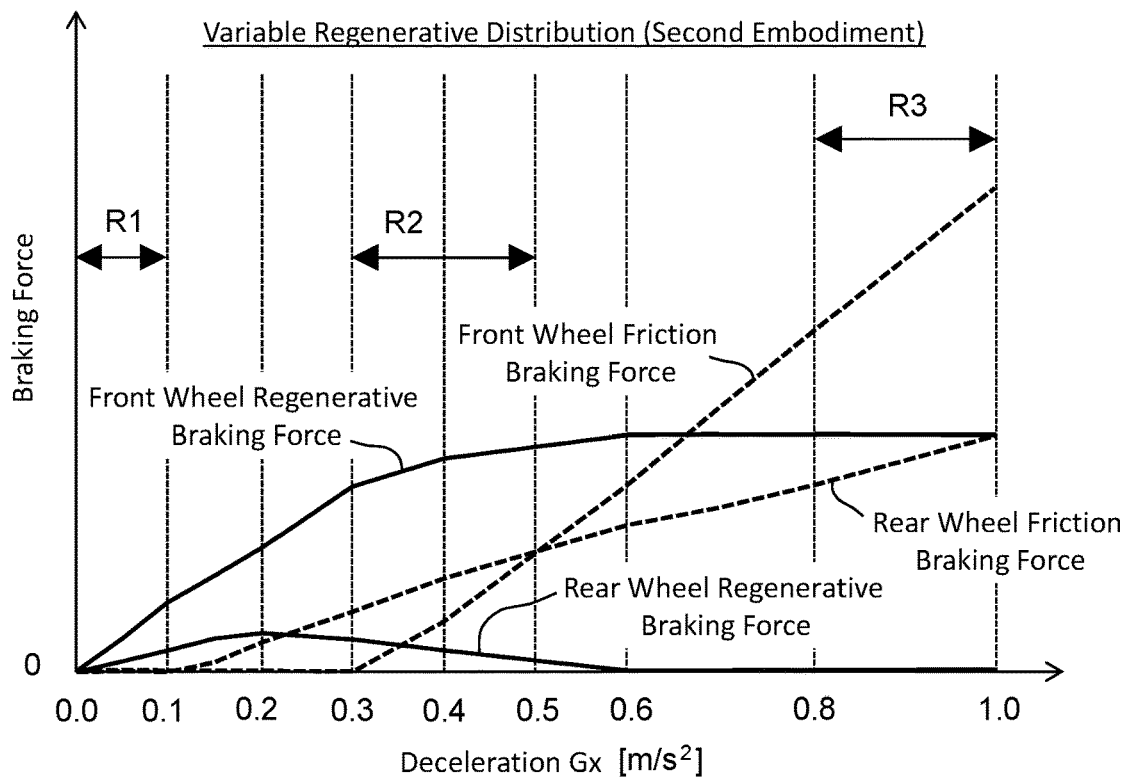
FIG. 16B is a graph illustrating a relation between individual braking forces and the deceleration Gx according to the second embodiment.

FIGS. 16A and 16B are graphs each illustrating a relation between the individual braking forces and the deceleration Gx according to the second embodiment. More specifically, FIG. 16A is associated with the characteristics of the first embodiment which are referred to for comparison with FIG. 16B. That is, the characteristics shown in FIG. 16A are based on the braking force distribution characteristic A and the constant regenerative distribution shown in FIG. 15. FIG. 16B is associated with the characteristics used in the second embodiment. That is, the characteristics shown in FIG. 16B are based on the front-rear distribution ratio α according to the braking force distribution characteristic A (see FIG. 10) and the variable regenerative distribution shown in FIG. 15.

As shown in FIGS. 16A and 16B, when compared with the first embodiment (constant regenerative distribution), according to the second embodiment (variable regenerative distribution), in a range on the higher deceleration side of the low deceleration range R1, the front wheel regenerative braking force is increased and the rear wheel friction braking force is increased.

As described above, according to the braking force distribution control of the second embodiment, the front-rear distribution ratio α is controlled in accordance with the required deceleration Gxr so as to follow the braking force distribution characteristic A (see FIG. 10) as in the first embodiment. Also, in the second embodiment, the front wheel braking force is distributed to the friction braking force and the regenerative braking force in accordance with the setting of the ratio β shown in FIG. 15. Moreover, the rear wheel braking force is distributed to the friction braking force and the regenerative braking force in accordance with the ratio γ (=1-β) determined in accordance with the ratio β. As a result, a vehicle braking posture is obtained which will be described below with reference to FIGS. 17 and 18.

FIG. 17 is a graph showing a relation between the pitch angle θ and the deceleration Gx according to the second embodiment in comparison between the braking force distribution characteristics. FIG. 18 is a graph showing a relation between the heave amount H and the deceleration Gx according to the second embodiment in comparison between the braking force distribution characteristics.

As shown in FIG. 17, when compared with the constant regenerative distribution (first embodiment), according to the variable regenerative distribution (second embodiment), the change in the pitch angle θ can be reduced to be small in the range on the higher deceleration side than the low deceleration range R1. That is, the nose-dive of the vehicle 1 is reduced. As a result, in this range on the higher deceleration side, the amounts of movement of the heads 7F and 7R of the persons onboard in the forward direction of the vehicle 1 can be reduced more effectively. That is, a more comfortable and secure vehicle braking posture can be obtained.

Furthermore, as shown in FIG. 18, when compared with the constant regenerative distribution (first embodiment), the amount of change in the heave (i.e., the amount of diving of the vehicle body 5) in the downward direction of the vehicle 1 can be increased in the range on the higher deceleration side than the low deceleration range R1. As a result, in this range on the higher deceleration side, it is possible to more effectively give a person onboard a feeling of security that the vehicle 1 sticks to the road surface. That is, a more comfortable and secure vehicle braking posture can be obtained.

It should be noted that, in the example shown in FIG. 15, in the entire range on the higher deceleration side than the low deceleration range R1, the ratio β is increased and the ratio γ is decreased as compared with the low deceleration range R1. Instead of this example, only for a part of the range on the higher deceleration side, such as only for the medium deceleration range R2, the ratio β may be increased and the ratio γ may be decreased as compared with the low deceleration range R1.

3. Third Embodiment

3-1. Configuration Example of Vehicle

Figure 19:
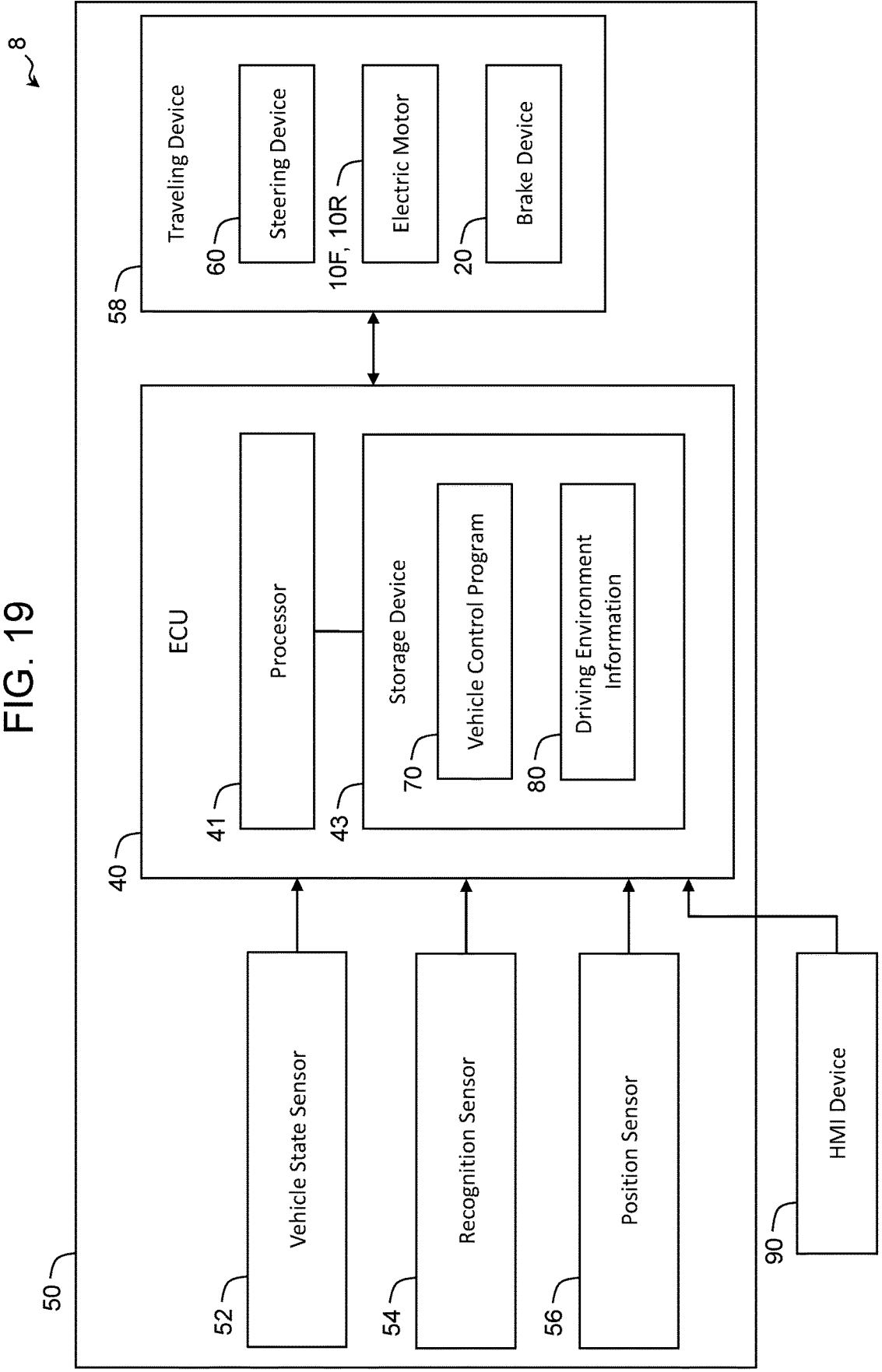
FIG. 19 is a block diagram illustrating a configuration example of a vehicle control system included in a vehicle according to a third embodiment.

FIG. 19 is a block diagram illustrating a configuration example of a vehicle control system 50 included in a vehicle 8 according to a third embodiment. The vehicle 8 is configured to be switchable between a manual driving mode in which the driving of the vehicle 8 is performed by a driver and an automated driving mode.

Specifically, the vehicle 8 includes a vehicle control system 50 in addition to the same configuration as the vehicle 1 shown in FIG. 1 (including the suspensions 4F and 4R shown in FIG. 2). The ECU 40 configured to control the vehicle control system 50 can perform automated driving of the vehicle 8. The vehicle control system 50 includes a vehicle state sensor 52, a recognition sensor 54, a position sensor 56, and a traveling device 58 together with the ECU 40.

The vehicle state sensor 52 is configured to detect a state of the vehicle 8. The vehicle state sensor 52 includes, for example, a yaw rate sensor and a steering angle sensor in addition to the wheel speed sensors 42 and the longitudinal acceleration sensor 44 described above.

The recognition sensor 54 is configured to recognize (detect) a situation around the vehicle 8. The recognition sensor 54 includes, for example, at least one of a camera, a laser imaging detection and ranging (LIDAR), and a radar.

The position sensor 56 is configured to detect a position and an orientation of the vehicle 8. The position sensor 56 includes, for example, a global navigation satellite system (GNSS) receiver.

The traveling device 58 includes a steering device 60 together with the brake device 20 and the electric motors 10F and 10R described above. The steering device 60 is configured to steer the wheels 2. For example, the steering device 60 includes an electric power steering (EPS) device.

A vehicle control program 70 is a computer program for controlling the vehicle 8 and is executed by a processor 41 of the ECU 40. The vehicle control program 70 is stored in a storage device 43 of the ECU 40. Alternatively, the vehicle control program 70 may be recorded in a computer-readable recording medium. The functions of the ECU 40 are achieved by the processor 41 executing the vehicle control program 70.

A driving environment information 80 is information indicating the driving environment of the vehicle 8 and is stored in the storage device 43. The driving environment information 80 includes map information, vehicle state information, surrounding situation information, and position information. More specifically, the vehicle state information is information indicating the state of the vehicle 8, such as the vehicle speed, the longitudinal acceleration, and the steering angle. The surrounding situation information is information indicating a situation around the vehicle 8 and is obtained using the recognition sensor 54. The position information is information indicating the position and the orientation (i.e., the traveling direction) of the vehicle 8 and is obtained from the measurement result by the position sensor 56.

The vehicle 8 further includes a human machine interface (HMI) device 90, such as a switch or a touch panel. According to the HMI device 90, the vehicle driving mode can be switched between the manual driving mode and the automated driving mode. The HMI device 90 is operated by the driver.

3-2. Braking Control

Also in the third embodiment, a braking force distribution control is executed in consideration of the vehicle posture. However, in the third embodiment, the braking force distribution characteristic is switched in accordance with whether the vehicle 8 is in the manual driving mode or the automated driving mode.

Specifically, as described above, according to the braking force distribution characteristic A (see FIG. 10), in the low deceleration range R1, a person onboard such as a driver is made to visually perceive a pitch change before the perception of the deceleration Gx. As a result, the feeling of deceleration can be given to the person at an early stage. On the other hand, during the automated driving mode in which the driving by the driver is not performed, there is no need to provide the person onboard with the feeling of deceleration at an early stage.

Figure 20:
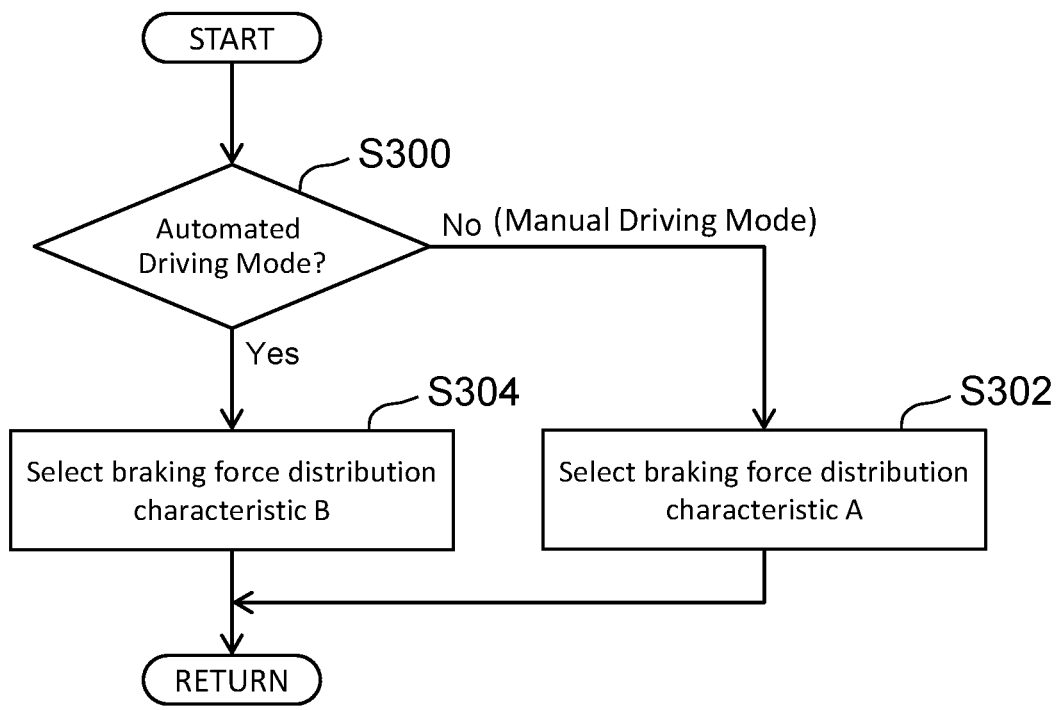
FIG. 20 is a flowchart illustrating processing related to a braking force distribution control according to the third embodiment.
Figure 21:
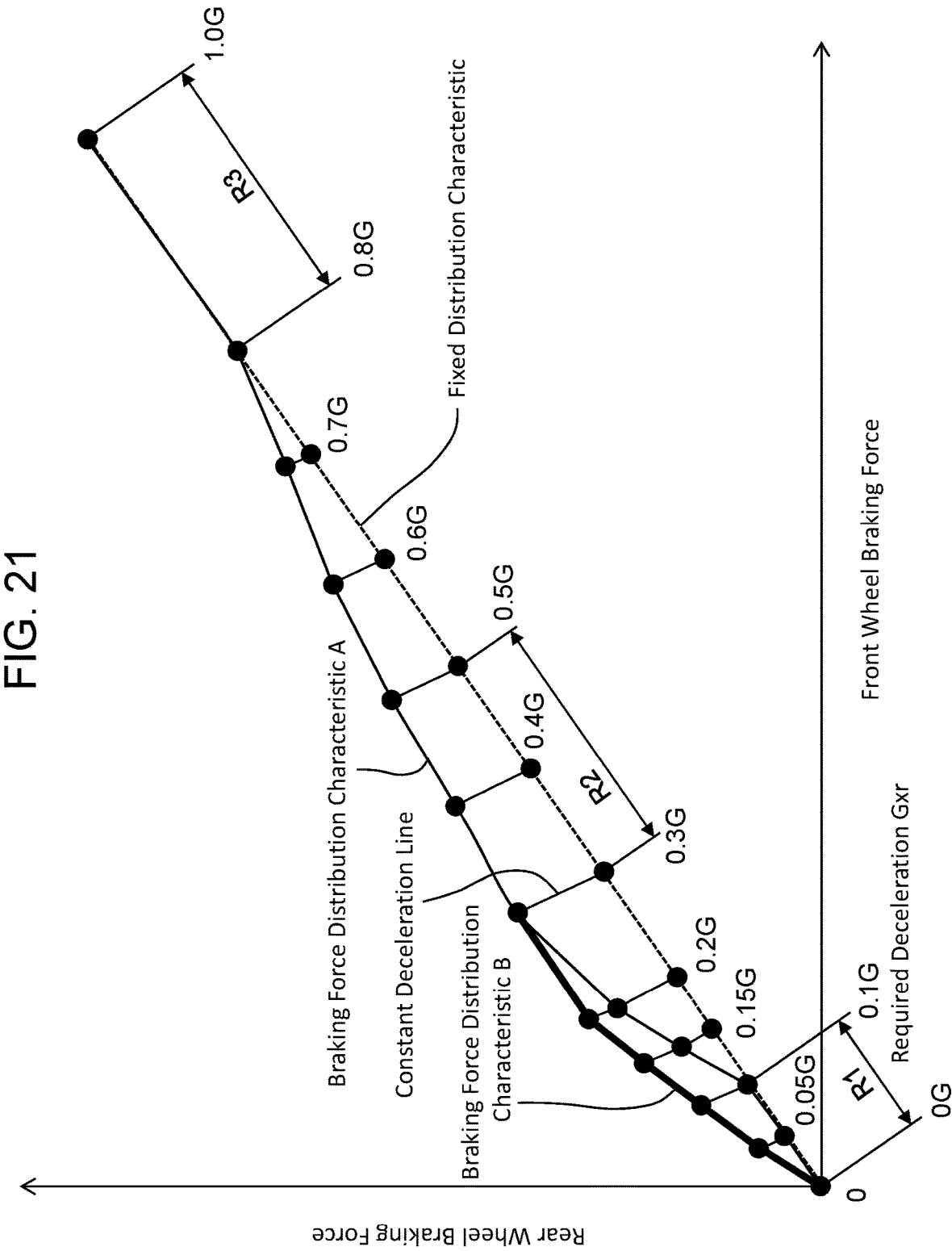
FIG. 21 is a graph showing braking force distribution characteristics A and B used in the third embodiment.

Accordingly, the braking force distribution control according to the third embodiment is executed as follows. FIG. 20 is a flowchart illustrating processing related to the braking force distribution control according to the third embodiment. The processing of this flowchart is repeatedly executed while the vehicle 8 is traveling. FIG. 21 is a graph showing braking force distribution characteristics A and B used in the third embodiment.

In FIG. 20, in step S300, the ECU 40 determines whether the current driving mode is the automated driving mode or the manual driving mode. The ECU 40 can perform the determination based on a signal received from the HMI device 90, for example.

When the determination result of step S300 is No, that is, when the vehicle is in the manual driving mode, the processing proceeds to step S302. In step S302, the ECU 40 selects the braking force distribution characteristic A which is a characteristic for the manual driving mode. As shown in FIG. 21, the selected braking force distribution characteristic A is the same as that used in the first embodiment (see FIG. 10).

On the other hand, when the determination result of step S300 is Yes, that is, when the vehicle is in the automated driving mode, the processing proceeds to step S304. In step S304, the ECU 40 selects a braking force distribution characteristic B which is a characteristic for the automated driving mode.

As shown in FIG. 21, the braking force distribution characteristic B is different from the braking force distribution characteristic A in the characteristic of the low deceleration range R1. That is, the braking force distribution characteristic B is set such that the front-rear distribution ratio $\alpha$ biased toward the rear wheels 2R than that in the fixed distribution characteristic equal to the braking force distribution characteristic A is obtained in the low deceleration range R1. It should be noted that, in the required deceleration range located between the low deceleration range R1 and the medium deceleration range R2, the front-rear distribution ratio $\alpha$ is changed so as to be gradually biased toward the rear wheels 2R with an increase in the required deceleration Gxr, from the value of the front-rear distribution ratio $\alpha$ in the range R1 toward the value of the front-rear distribution ratio $\alpha$ in the range R2.

In addition, the control of the brake device 20 for achieving the braking force distribution characteristic B can be performed, for example, by causing the ECU 40 to execute the same processing as the flowchart shown in FIG. 11 described above. However, since the automated driving mode is being executed, the required deceleration Gxr is calculated in accordance with a request from the vehicle control system 50 instead of the driver.

3-3. Effect

Figure 22:
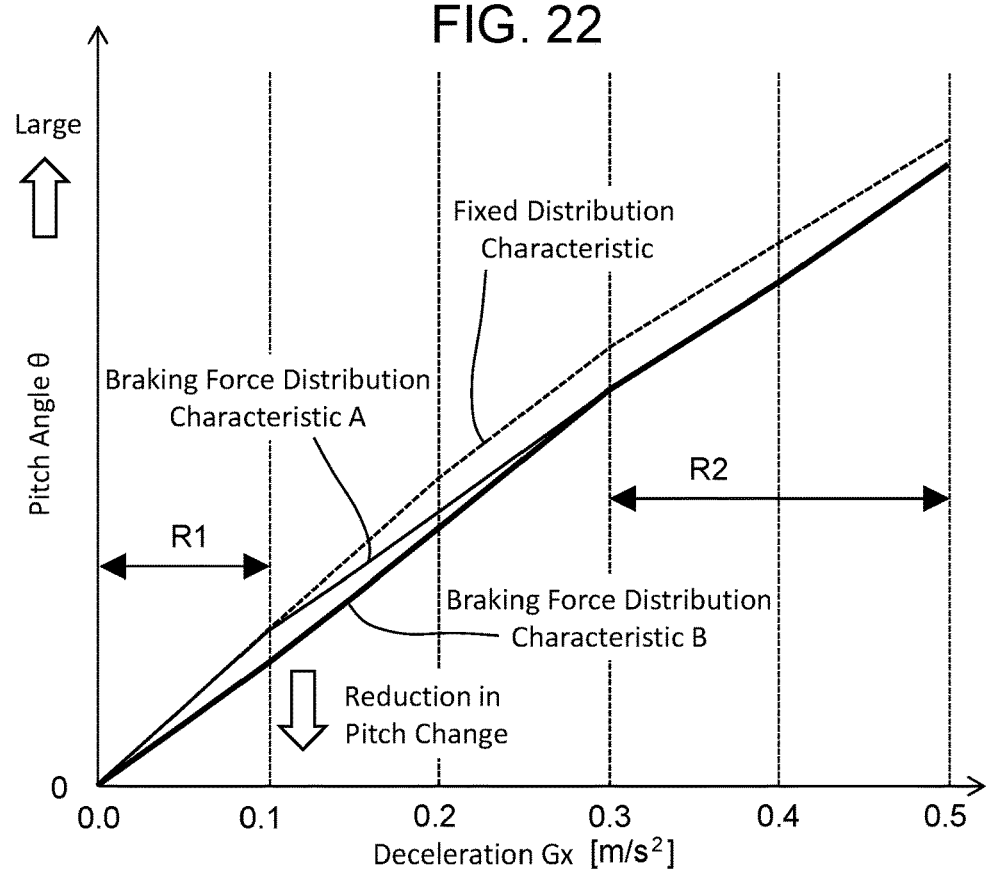
FIG. 22 is a graph showing a relation between the pitch angle θ and the deceleration Gx according to the third embodiment in comparison between braking force distribution characteristics.
Figure 23:
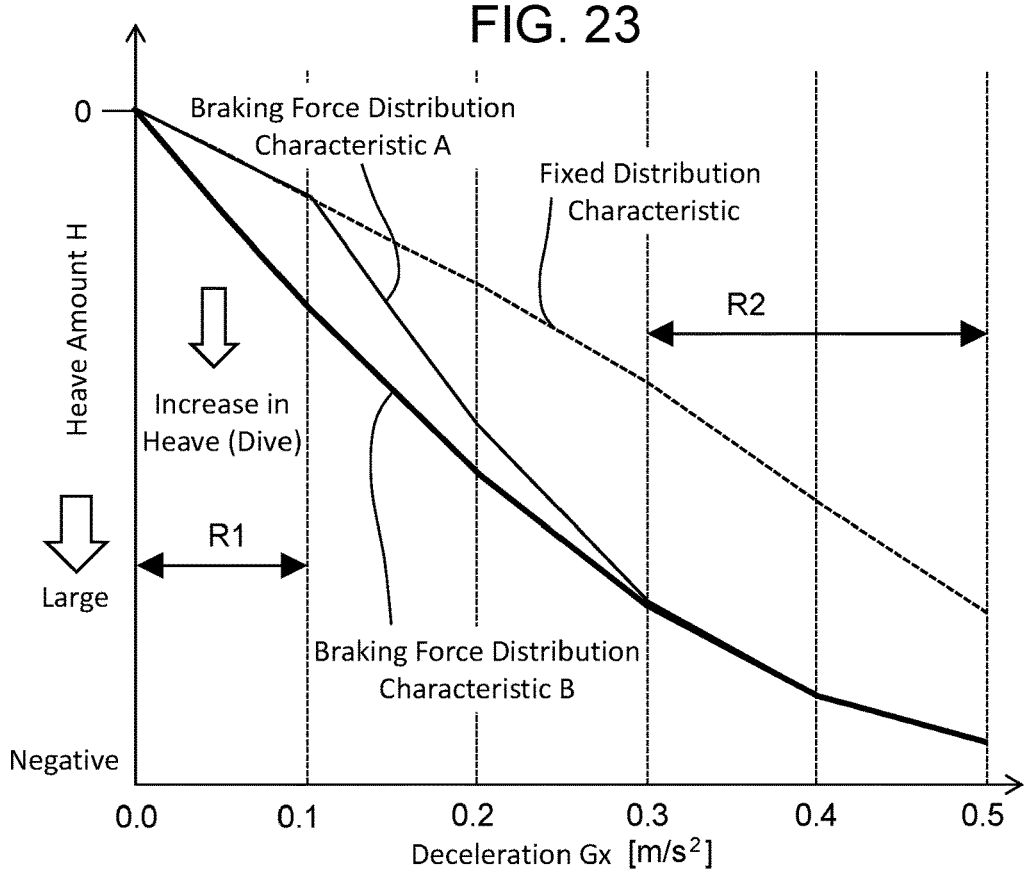
FIG. 23 is a graph showing a relation between the heave amount H and the deceleration Gx according to the third embodiment in comparison between braking force distribution characteristics.

FIG. 22 is a graph showing a relation between the pitch angle $\theta$ and the deceleration Gx according to the third embodiment in comparison between the braking force distribution characteristics. FIG. 23 is a graph showing a relation between the heave amount H and the deceleration Gx according to the third embodiment in comparison between the braking force distribution characteristics.

As shown in FIG. 22, according to the braking force distribution characteristic B, in the low deceleration range R1, the pitch change due to braking can be reduced to be smaller than that in the braking force distribution characteristic A (=fixed distribution characteristic). As a result, the amounts of movement of the heads 7F and 7R of persons onboard in the forward direction of the vehicle 8 can be reduced, and the feeling of deceleration can therefore be less likely to be given to the persons. Thus, it is possible to improve the comfort of a person onboard at the time of braking performed during execution of the automated driving mode.

As described above, according to the third embodiment, in the low deceleration range R1, when the manual driving mode is selected, a person such as a driver can be given a feeling of deceleration at an early stage, and when the automated driving mode is selected, the pitch change can be reduced to make it difficult to give the person the feeling of deceleration.

In addition, as shown in FIG. 23, according to the braking force distribution characteristic B, in the low deceleration range R1, the heave (i.e., the diving of the vehicle body 5) in the downward direction of the vehicle 8 due to braking can be made larger than that in the braking force distribution characteristic A (=fixed distribution characteristic). Therefore, the feeling of security with respect to braking can also be improved in the low deceleration range R1 during execution of the automated driving mode.

It should be noted that, in the braking force distribution control according to the third embodiment described above, the ratios $\beta$ and $\gamma$ may also be changed as described in the second embodiment.

4. Fourth Embodiment

A fourth embodiment is the same as the third embodiment in that the braking force distribution characteristic is switched between the braking force distribution characteristic A and the braking force distribution characteristic B during the travel of the vehicle 8. However, in the fourth embodiment, the braking force distribution characteristic is switched (selected) as follows. It should be noted that vehicles to which the fourth embodiment are applied are not limited to automated driving vehicles.

A vehicle may be driven by a professional driver, such as a private chauffeur or a taxi driver. In an example in which the driving is performed by a professional driver while a specific person such as a passenger is placed in the rear seat 6R, priority needs to be given to the comfort of the passenger in the rear seat 6R.

Figure 24:
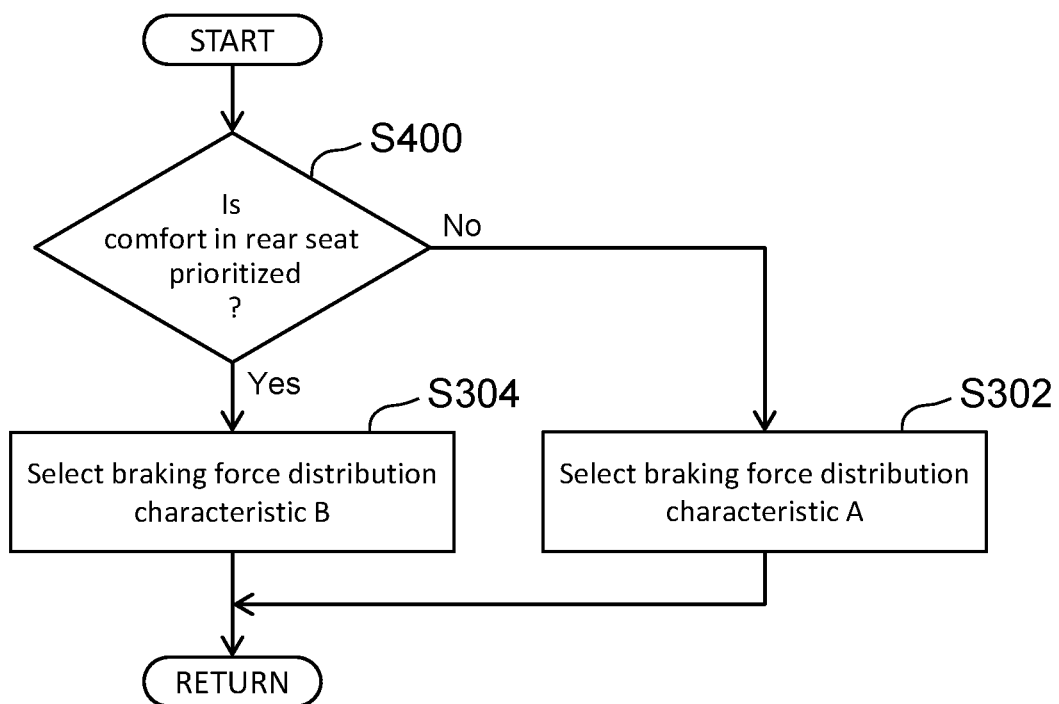
FIG. 24 is a flowchart illustrating processing related to a braking force distribution control according to a fourth embodiment.

Accordingly, a braking force distribution control according to the fourth embodiment is executed as follows. FIG. 24 is a flowchart illustrating processing related to the braking force distribution control according to the fourth embodiment. The processing of this flowchart is repeatedly executed while the vehicle 8 is traveling.

In FIG. 24, in step S400, the ECU 40 determines whether or not it is a situation in which the comfort of a passenger in the rear seat 6R should be prioritized. This determination can be made based on, for example, a signal from the HMI device 90 operated by the driver (i.e., the professional driver). Specifically, the determination can be made based on whether or not the ECU 40 has received a request to prioritize the comfort of the passenger in the rear seat 6R, from the driver via the HMI device 90. Instead of this example, the ECU 40 may perform the determination, for example, on the basis of whether or not the boarding of a passenger in the rear seat 6R is recognized using a vehicle interior camera or a seat belt wearing detection sensor.

When the determination result of step S400 is No, that is, when the comfort of the passenger in the rear seat 6R is not prioritized (for example, when there is no passenger in the rear seat 6R), in step S302 the ECU 40 selects the braking force distribution characteristic A.

On the other hand, when the determination result of step S400 is Yes, that is, when the comfort of the passenger in the rear seat 6R is prioritized, in step S304 the ECU 40 selects the braking force distribution characteristic B.

According to the braking force distribution control of the fourth embodiment described above, the braking force distribution characteristic B is selected when priority is given to the comfort of a passenger in the rear seat 6R. According to the braking force distribution characteristic B, in the low deceleration range R1, the effect of providing the driver with the feeling of deceleration at an early stage is not obtained, but the comfort of the passenger in the rear seat 6R can be improved by reducing the pitch change (see FIG. 22). That is, the comfort of the passenger in the rear seat 6R is prioritized over the early perception of the deceleration feeling by the driver.

It should be noted that, in the braking force distribution control according to the fourth embodiment described above, the ratios β and γ may be changed as described in the second embodiment.

5. Other Embodiments

The change of the front-rear distribution ratio α according to the braking force distribution characteristic A (see FIGS. 10 and 21) and the change of the front-rear distribution ratio α according to the braking force distribution characteristic B (see FIG. 21) that are described above may be executed for a vehicle that does not have the regenerative braking force (i.e., a vehicle that uses only the friction braking force). In this example, the suspension displacement amounts $\Delta X_f$ and $\Delta X_r$ are expressed by the following Equations (6) and (7).

$$\Delta X_f = \left\{ \frac{h}{W_B} - \alpha \cdot \text{AntiDive} \right\} \frac{F}{k_f} \quad (6)$$

$$\Delta X_r = -\left\{ \frac{h}{W_B} - (1-\alpha) \cdot \text{AntiSquat} \right\} \frac{F}{k_r} \quad (7)$$

Moreover, when the regenerative braking force is used, in-wheel motors may be used instead of the front wheel electric motor 10F and the rear wheel electric motor 10R that drive the front wheels 2F and the rear wheels 2R via the front wheel drive shaft 3F and the rear wheel drive shaft 3R, respectively. However, the point of application of the regenerative braking force in the example in which the in-wheel motors are used is different from the center position of each wheel 2 which is the point of application in the example in which the electric motors 10F and 10R are used, and is the same ground contact surface of each wheel 2 as the point of application in the example of the friction braking force. Therefore, the suspension displacement amounts $\Delta X_f$ and $\Delta X_r$ in the example in which the in-wheel motors are used are expressed by Equations (6) and (7).

Furthermore, when the front-rear distribution ratio α is changed using the regenerative braking force, the electric motor (including the in-wheel motor) may be provided to drive only one of the front wheels and the rear wheels except for the braking force distribution control (see FIG. 15) according to the second embodiment in which the ratios β and γ are variable in accordance with the required deceleration Gxr.

What is claimed is:

1. A method of controlling a vehicle including a brake device configured to change a front-rear distribution ratio of braking force with respect to front and rear wheels, the method comprising:
    controlling the brake device such that the front-rear distribution ratio is in accordance with a fixed distribution characteristic in which the front-rear distribution ratio is constant regardless of deceleration of the vehicle in at least a part of a first range being a required deceleration range lower than a lower limit value of the deceleration perceivable by a person in the vehicle; and
    controlling the brake device such that the front-rear distribution ratio is biased toward the rear wheel than that in the fixed distribution characteristic in a second range in which the deceleration is higher than that in the first range.

2. The method according to claim 1, further comprising controlling the brake device such that the front-rear distribution ratio is in accordance with the fixed distribution characteristic in a third range in which the deceleration is higher than that in the second range.

3. The method according to claim 1, wherein
    the vehicle includes a front wheel electric motor configured to drive the front wheel via a front wheel drive shaft, and a rear wheel electric motor configured to drive the rear wheel via a rear wheel drive shaft, and
    the brake device includes a regenerative brake device configured to control front wheel regenerative braking force applied to the front wheel using the front wheel electric motor, and rear wheel regenerative braking force applied to the rear wheel using the rear wheel electric motor, the method further comprising
    controlling the brake device such that, in at least a part of a required deceleration range higher than the first range, a first ratio of the front wheel regenerative braking force to front wheel braking force is higher than that in the first range and a second ratio of the rear wheel regenerative braking force to rear wheel braking force is lower than that in the first range.

4. The method according to claim 3, wherein
    the second ratio is equal to a value obtained by subtracting the first ratio from 1.

5. The method according to claim 1, wherein
    the vehicle is configured to be switchable between a manual driving mode and an automated driving mode, the method further comprising:
    in the manual driving mode, controlling the brake device such that the front-rear distribution ratio is in accordance with the fixed distribution characteristic in the at least a part of the first range; and
    in the automated driving mode, controlling the brake device such that the front-rear distribution ratio is biased toward the rear wheel than that in the fixed distribution characteristic in the at least a part of the first range.

6. The method according to claim 1, the method further comprising:
    when comfort of a passenger in a rear seat of the vehicle is not prioritized, controlling the brake device such that the front-rear distribution ratio is in accordance with the fixed distribution characteristic in the at least a part of the first range; and
    when the comfort is prioritized, controlling the brake device such that the front-rear distribution ratio is biased toward the rear wheel than that in the fixed distribution characteristic in the at least a part of the first range.

7. A vehicle, comprising:
    a brake device configured to change a front-rear distribution ratio of braking force with respect to front and rear wheels; and
    an electronic controller configured to:
    control the brake device such that the front-rear distribution ratio is in accordance with a fixed distribution characteristic in which the front-rear distribution ratio is constant regardless of deceleration of the vehicle in at least a part of a first range being a required deceleration range lower than a lower limit value of the deceleration perceivable by a person in the vehicle; and
control the brake device such that the front-rear distribution ratio is biased toward the rear wheel than that in the fixed distribution characteristic in a second range in which the deceleration is higher than that in the first range.

8. The vehicle according to claim 7, wherein
the electronic controller is configured to control the brake device such that the front-rear distribution ratio is in accordance with the fixed distribution characteristic in a third range in which the deceleration is higher than that in the second range.

9. The vehicle according to claim 7, further comprising:
a front wheel electric motor configured to drive the front wheel via a front wheel drive shaft; and
a rear wheel electric motor configured to drive the rear wheel via a rear wheel drive shaft, wherein
the brake device includes a regenerative brake device configured to control front wheel regenerative braking force applied to the front wheel using the front wheel electric motor, and rear wheel regenerative braking force applied to the rear wheel using the rear wheel electric motor, and
the electronic controller is configured to control the brake device such that, in at least a part of a required deceleration range higher than the first range, a first ratio of the front wheel regenerative braking force to front wheel braking force is higher than that in the first range and a second ratio of the rear wheel regenerative braking force to rear wheel braking force is lower than that in the first range.

10. The vehicle according to claim 9, wherein
the second ratio is equal to a value obtained by subtracting the first ratio from 1.

11. The vehicle according to claim 7, wherein
the vehicle is configured to be switchable between a manual driving mode and an automated driving mode, and
the electronic controller is configured to:
in the manual driving mode, control the brake device such that the front-rear distribution ratio is in accordance with the fixed distribution characteristic in the at least a part of the first range; and
in the automated driving mode, control the brake device such that the front-rear distribution ratio is biased toward the rear wheel than that in the fixed distribution characteristic in the at least a part of the first range.

12. The vehicle according to claim 7, wherein
the electronic controller is configured to:
when comfort of a passenger in a rear seat of the vehicle is not prioritized, control the brake device such that the front-rear distribution ratio is in accordance with the fixed distribution characteristic in the at least a part of the first range; and
when the comfort is prioritized, control the brake device such that the front-rear distribution ratio is biased toward the rear wheel than that in the fixed distribution characteristic in the at least a part of the first range.

* * * * *